(12) United States Patent
Bendlin et al.

(10) Patent No.: US 10,849,113 B2
(45) Date of Patent: Nov. 24, 2020

(54) DYNAMIC SPECTRUM ACCESS WITH FLEXIBLE BANDWIDTH FOR LICENSED SHARED ACCESS SYSTEMS

(71) Applicant: Apple Inc., Cupertino, CA (US)

(72) Inventors: Ralf Bendlin, Portland, OR (US); Hwan-Joon Kwon, Santa Clara, CA (US); Jong-Kae Fwu, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/742,481

(22) PCT Filed: Apr. 1, 2016

(86) PCT No.: PCT/US2016/025563
§ 371 (c)(1),
(2) Date: Jan. 5, 2018

(87) PCT Pub. No.: WO2017/023370
PCT Pub. Date: Feb. 9, 2017

(65) Prior Publication Data
US 2018/0206214 A1 Jul. 19, 2018

Related U.S. Application Data

(60) Provisional application No. 62/200,924, filed on Aug. 4, 2015.

(51) Int. Cl.
*H04W 72/00* (2009.01)
*H04W 72/04* (2009.01)
(Continued)

(52) U.S. Cl.
CPC ......... *H04W 72/042* (2013.01); *H04L 1/0061* (2013.01); *H04L 5/0053* (2013.01);
(Continued)

(58) Field of Classification Search
CPC . H04W 72/042; H04W 72/044; H04W 48/12; H04W 88/08; H04L 1/0061; H04L 5/0053; H04L 5/0096
See application file for complete search history.

(56) References Cited

U.S. PATENT DOCUMENTS

2011/0070845 A1* 3/2011 Chen ................... H04W 72/042
455/91
2011/0299489 A1 12/2011 Kim et al.
(Continued)

FOREIGN PATENT DOCUMENTS

WO 2011032035 3/2011

OTHER PUBLICATIONS

International Search Report and Written Opinion for International Patent Application No. PCT/US2016/025563, dated Jul. 12, 2016.
(Continued)

*Primary Examiner* — Pakee Fang
(74) *Attorney, Agent, or Firm* — Sterne, Kessler, Goldstein & Fox P.L.L.C.

(57) ABSTRACT

An eNB (or other base station) comprising one or more processors may generate a plurality of channel status activation indicators. The eNB's processors may encode the plurality of indicators into a Downlink Control Information (DCI) codeword, may scramble the cyclic redundancy check bits of the DCI with a predetermined sequence, and may generate the DCI codeword to the UE as part of a DCI transmission on a physical control channel. A UE (or other mobile handset) comprising one or more processors may process a DCI transmission from the eNB, the DCI transmission including a DCI codeword. The UE's processors may decode a plurality of channel status activation indicators from the DCI codeword, may check if the cyclic redundancy bits of the DCI are scrambled with a predetermined sequence, and may trigger a plurality of physical
(Continued)

layer activation-and-deactivation circuitries based on the plurality of channel status activation indicators.

22 Claims, 23 Drawing Sheets

(51) Int. Cl.
*H04L 5/00* (2006.01)
*H04L 1/00* (2006.01)
*H04W 48/12* (2009.01)
*H04W 88/08* (2009.01)

(52) U.S. Cl.
CPC ......... *H04L 5/0096* (2013.01); *H04W 72/044* (2013.01); *H04W 48/12* (2013.01); *H04W 88/08* (2013.01)

(56) References Cited

U.S. PATENT DOCUMENTS

2016/0219557 A1* 7/2016 He .................. H04L 5/0053
2018/0338319 A1* 11/2018 Kim .................. H04W 76/14

OTHER PUBLICATIONS

Intel Corporation, "Uplink transmission for LAA", 3GPP Draft; R2-152214_LAA_UP_LBT_V1; vol. RAN WG2; Fukuoka, Japan; May 16, 2015.
Microsoft, Corp., "Discussion on required functionalities for licensed-assisted access using LTE", 3GPP Draft; R1-150630; vol. RAN WG1; Athens, Greece; Jan. 30, 2015.
ZTE, "DL control enhancements for Carrier Aggregation", 3GPP Draft; R1-151716; vol. RAN WG1; Belgrade, Serbia; Apr. 11, 2015.
International Preliminary Report on Patentability for International Patent Application No. PCT/US16/25563, dated Feb. 15, 2018.

* cited by examiner

DYNAMIC SPECTRUM ACCESS WITH FLEXIBLE BANDWIDTH FOR LICENSED SHARED ACCESS SYSTEMS

CLAIM OF PRIORITY

The present application is a National Stage Entry of, and claims priority to PCT Application Serial Number PCT/US16/25563, filed on Apr. 1, 2016 and entitled "DYNAMIC SPECTRUM ACCESS WITH FLEXIBLE BANDWIDTH FOR LICENSED SHARED ACCESS SYSTEMS", which claims priority under 35 U.S.C. § 119(e) to U.S. Provisional Patent Application Ser. No. 62/200,924 filed Aug. 4, 2015 and entitled "DYNAMIC SPECTRUM ACCESS WITH FLEXIBLE BANDWIDTH FOR LICENSED SHARED ACCESS SYSTEMS," which are both incorporated by reference in their entireties.

BACKGROUND

Various wireless cellular communication systems have been implemented or are being proposed, including a 3rd Generation Partnership Project (3GPP) Universal Mobile Telecommunications System (UMTS), a 3GPP Long-Term Evolution (LTE) system, a 3GPP LTE-Advanced system, and a $5^{th}$ Generation wireless system/$5^{th}$ Generation mobile networks (5G) system/$5^{th}$ Generation new radio (NR) system. In some cellular communication systems, such as a 3GPP UMTS system or a 3GPP LTE system, a Mobile Network Operator (MNO) may obtain an exclusive license for the use of a specific part of the spectrum.

An MNO's license may be limited to a range of frequencies. A license may be further limited to a geographically-bounded region, and may also be limited to specific times, such as specific ranges of hours, days, weeks, months, and/or years. An MNO's license may accordingly apply to one or more of a specific range of frequencies, a specific geographical region, and a specific range of times.

In contrast with exclusive licenses, a spectrum in a Licensed-Shared Access (LSA) system may be licensed to multiple users and/or licensees, and an MNO may accordingly be disposed to share a licensed spectrum with others who are also licensed to use the spectrum. In some cases, an MNO may be disposed to share licensed spectrum with "incumbent" users, whose use of that spectrum may already be licensed or otherwise protected. In other cases, a national regulatory authority (NRA) may assign portions of the spectrum to more than one MNO, and one MNO may be disposed to share licensed spectrum with another MNO. Moreover, different licensees of a spectrum (and possibly within a specific geographic region and/or for a certain period in time) may have different priorities for their use of the spectrum.

BRIEF DESCRIPTION OF THE DRAWINGS

The embodiments of the disclosure will be understood more fully from the detailed description given below and from the accompanying drawings of various embodiments of the disclosure. However, while the drawings are to aid in explanation and understanding, they are only an aid, and should not be taken to limit the disclosure to the specific embodiments depicted therein.

DETAILED DESCRIPTION

Figure 1:
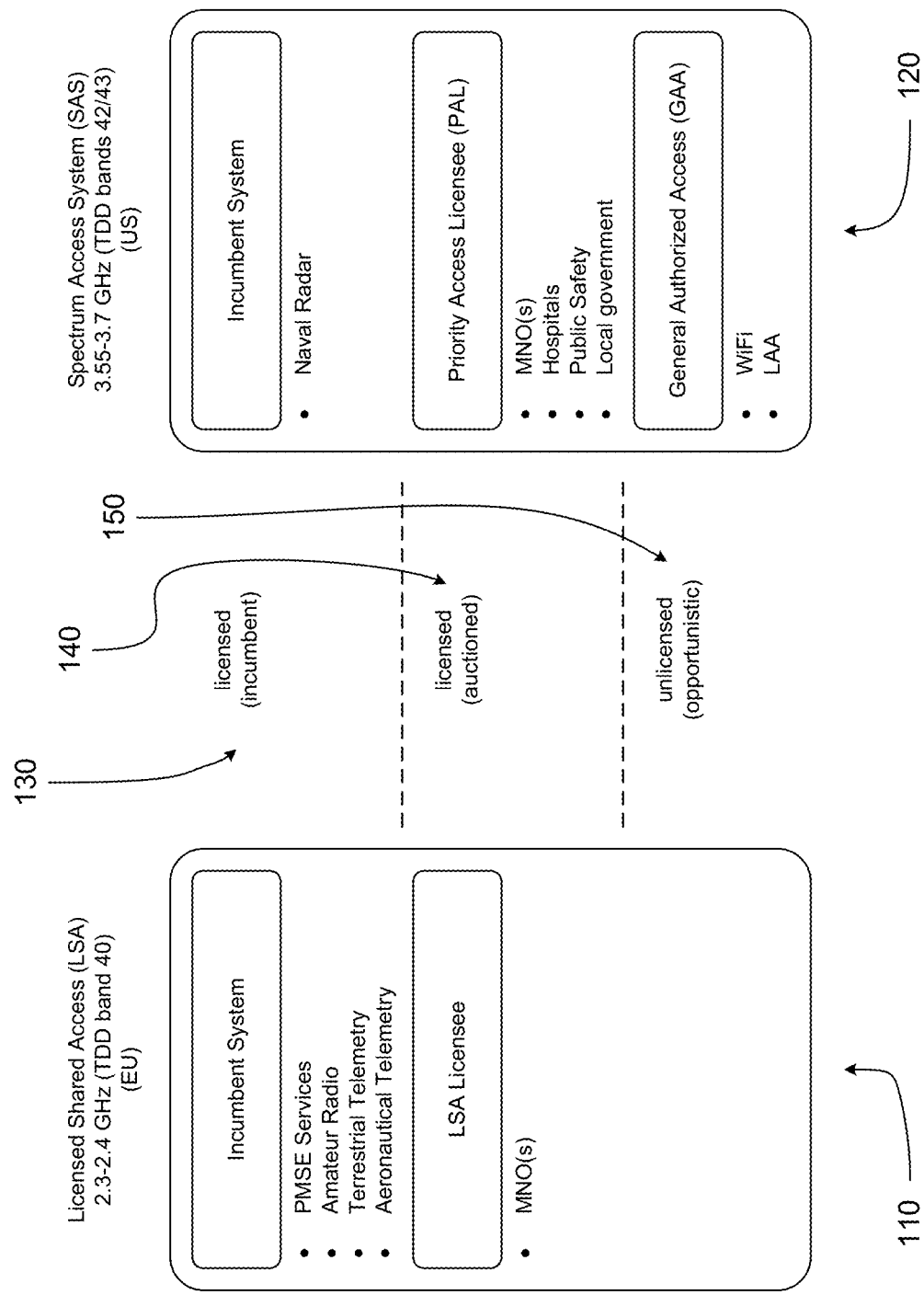
FIG. 1 illustrates examples of a Licensed Shared Access (LSA) system and a Spectrum Access System (SAS), in accordance with some embodiments.

In a LSA system, different licensees of a spectrum (and possibly for a geographical region and/or a specific range of times) may have different priorities for using the spectrum. As a result, LSA systems should provide means for detection of other users and protection of other users, in accordance with their priorities and possibly a sharing framework. For example, an MNO using a spectrum may be disposed to protect higher priority users in the same spectrum, either in the same region or a nearby geographical region, or may be disposed to protect another MNO using the spectrum in an adjacent band of frequencies in the same region or a nearby geographical region. Various mechanisms and methods for protecting other users and/or licensees in an LSA system are discussed below.

In the following description, numerous details are discussed to provide a more thorough explanation of embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical, mechanical, or magnetic connection between the things that are connected, without any intermediary devices. The term "coupled" means either a direct electrical, mechanical, or magnetic connection between the things that are connected or an indirect connection through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The terms "substantially," "close," "approximately," "near," and "about" generally refer to being within +/−10% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking, or in any other manner.

It is to be understood that the terms so used are interchangeable under appropriate circumstances such that the embodiments of the invention described herein are, for example, capable of operation in other orientations than those illustrated or otherwise described herein.

The terms "left," "right," "front," "back," "top," "bottom," "over," "under," and the like in the description and in the claims, if any, are used for descriptive purposes and not necessarily for describing permanent relative positions.

For purposes of the embodiments, the transistors in various circuits, modules, and logic blocks are Tunneling FETs (TFETs). Some transistors of various embodiments may comprise metal oxide semiconductor (MOS) transistors, which include drain, source, gate, and bulk terminals. The transistors may also include Tri-Gate and FinFET transistors, Gate All Around Cylindrical Transistors, Square Wire, or Rectangular Ribbon Transistors or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bipolar junction transistors-BJT PNP/NPN, BiCMOS, CMOS, etc., may be used for some transistors without departing from the scope of the disclosure.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

As discussed in detail below, within an MNO in an LSA system, eNBs forming a Radio Access Network (RAN) may be capable of sensing interfering energy from other Radio Access Technologies (RATs), interfering energy from other MNOs of the same RAT, or aggregate interference levels. Each eNB may have an interface and associated application protocol for communicating with a Core Network (CN). In turn, a CN may have an interface and associated application protocol for communicating with one or more LSA infrastructure components, such as an LSA repository (LR), an LSA controller (LC), or a geo-location database (GLDB).

If an eNB senses that a higher-priority user has become active on parts of a spectrum, or if the eNB's LSA infrastructure instructs the eNB's RAN to cease operation on parts of the spectrum because a higher-priority user has become active on parts of the spectrum, the eNB may take action in order to protect the higher-priority user.

The eNB may send a physical layer (PHY) indicator to User Equipments (UEs) connected to its cells on that part of the spectrum instructing them to cease operation. This PHY indicator may be transmitted to all UEs on the Physical Downlink Control Channel (PDCCH) through a Downlink Control Information (DCI) whose cyclic redundancy check (CRC) bits have been scrambled by a dedicated identifier. This identifier may be a special purpose Radio Network Temporary Identifier (RNTI) defined for this purpose in LSA systems, and may be considered an LSA-RNTI. (Any other name or terminology is not precluded, however, and the term LSA-RNTI is merely provided in an illustrative sense rather than a limiting sense.) In this way, upon receiving the PHY identifier, UEs may operate in ways that protect higher-priority users.

One advantage of such techniques is that all UEs under an eNB's control may be sent a common PHY indicator, and may not need to be configured in a UE-specific manner via a Radio Resource Control (RRC) protocol or a Medium Access Control (MAC) protocol procedure. In addition, low latency may be important to ensure almost instantaneous protection of other users within the spectrum, and to improve quality of service (QoS) for UEs during a deactivation procedure. Since higher-level protocols within the protocol stack may have larger latencies, and since the PHY layer may be the lowest layer in the protocol stack, a PHY-layer-based technique may advantageously minimize latencies involved in the eNB procedures instructing various UEs to cease operation to satisfy LSA requirements.

In addition, an eNB may be disposed to ramp down its transmit power, or possibly even turn off its transceiver circuitry, in order to protect other users within the spectrum, and if UEs are not informed of the impending cessation, radio link failures (RLFs) may occur resulting in deteriorated Quality-of-Service experiences at the UEs. A PHY identifier instructing cells to cease operation may thus advantageously reduce RLFs and consequently increase Quality-of-Service and/or Quality-of-Experience. Finally, an eNB may be disposed to inform a UE of an impending cessation, in order to provide means for cancelling scheduled UL transmissions from the UE to the eNB upon detection of protected users within the spectrum.

FIG. 1 illustrates examples of a Licensed Shared Access (LSA) system and a Spectrum Access System (SAS), in accordance with some embodiments. A SAS may be a version of an LSA for the United States (however, neither the term LSA nor the term SAS should be construed in a limited sense for the embodiments herein). For purposes of this application, the terms LSA and SAS may be used interchangeably and may be understood to encompass substantially similar subject matter, and in other embodiments, different terminology may apply as well.

The Conference of Postal and Telecommunications Administrations (CEPT) in Europe and the Federal Communications Commission (FCC) in the United States are examples of regional or national regulatory authorities that have agreed to the introduction of LSA systems. Users may have different priority in accessing a particular spectrum. An LSA system may also contemplate and protect unlicensed users of the spectrum.

In FIG. 1, an LSA system 110 as proposed in Europe (for the 2.3-2.4 GHz band, e.g., time-division duplex (TDD) band 40) is compared with a SAS system 120 as proposed in the United States (for the 3.55-3.70 GHz band, e.g., TDD bands 42/43). LSA system 110 has two tiers, one for incumbent-licensed users 130, and one for auctioned-licensed users 140. SAS system 120 has three tiers that span incumbent-licensed users 130, auctioned-licensed users 140, and opportunistic or unlicensed users 150. In various embodiments, different terminologies may apply. For example, an auctioned-licensed user may be referred to as an LSA licensee or a priority access licensee (PAL). Similarly, an opportunistic or unlicensed user may be referred to as a general authorized access (GAA) user. Other nomenclatures may similarly be conceivable.

Examples of incumbent-licensed users 130 may include program making and special events (PMSE) services, amateur radio, terrestrial telemetry, and aeronautical telemetry (for LSA system 110), and may include naval radar (for SAS system 120). Examples of incumbent user equipment may include cordless microphones, wireless cameras, broadcasting vehicles (such as vans and helicopters), PMSE services, radar stations (for naval, terrestrial, or aeronautical telemetry or meteorology), and amateur radio equipment.

For LSA system 110 and SAS system 120, spectrum having one or more incumbent users may be auctioned to one or more LSA licensees. Auction-licensed users 140 may include MNOs (for both LSA system 110 and SAS system 120), and may include hospitals, public safety agencies, and local government (for SAS system 120). Auction-licensed users 140 may be termed LSA Licensees (e.g., for LSA system 110), or may be termed priority access licensees (PALs) (e.g., for SAS system 120).

For SAS system 120, opportunistic or unlicensed users 150 may include WiFi based on the IEEE 802.11 family of standards, and license-assisted access (LAA) cellular equipment (such as LAA-compliant eNBs and/or UEs). Opportunistic or unlicensed use of licensed spectrum may be termed general authorized access (GAA). Although unlicensed, GAA use of LSA spectrum may still be authorized. In such instances, the term "unlicensed" may refer to the technologies and access schemes used by the transmitter and receiver rather than the licensing model.

In an LSA system, for example in either LSA system 110 or SAS system 120, the general principle is that lower-priority users (e.g., users of a lower priority tier) should protect higher-priority users, but higher-priority users need not take lower-priority users into account. In addition, users of a given priority level and/or tier may have to protect other users of the same priority level/tier. Auction-licensed users 140 may access an LSA spectrum when not in use (e.g., in a particular geographical region) by an incumbent-licensed user 130 and/or other auction-licensed users. Opportunistic or unlicensed users 150 may access an LSA spectrum when not in use (e.g., in a particular geographical region) by either an incumbent-licensed user 130, an auction-licensed user 140, or other opportunistic or unlicensed users. For example, PALs may protect incumbent users and other PALs, but need not protect GAA equipment. In comparison, GAA equipment may protect all participants in the LSA system.

Meanwhile, in the 3GPP LTE wireless communication standards, a UE may monitor a Physical Downlink Control Channel (PDCCH) for downlink control information (DCI) whose cyclic redundancy check (CRC) bits have been scrambled with various radio network temporary identifiers (RNTIs). In the UE, in every subframe, higher protocol layers may instruct the PHY layer to monitor common and UE-specific search spaces for specific RNTIs to receive the associated DCI. The higher protocol layers may in turn provide such instructions as configured by the RAN through the RRC protocol, or as required by specification.

For example, a UE may monitor a common search space for a system information RNTI (SI-RNTI) in defined subframes in order to receive system information blocks (SIBs) on the broadcast control channel (BCCH). In other cases, the RAN may configure a UE's higher layers to instruct the PHY to monitor for a different RNTI, such as a paging RNTI (P-RNTI) which may merely be transmitted during configured paging occasions. An RNTI may be fixed by specification, as with the SI-RNTI, or may be configured via RRC, as with a cell RNTI (C-RNTI) (which may be configured during RRC connection setup).

The 3GPP LTE standards define a variety of different RNTIs, such as the SI-RNTI, the P-RNTI, the C-RNTI, an M-RNTI (for multimedia broadcast/multicast services (MBMS)), a temporary C-RNTI, and a random access RNTI (RA-RNTI). Release 12 of the LTE standards define an enhanced interference management and traffic adaptation RNTI (eIMTA-RNTI) to dynamically indicate the TDD uplink (UL)/downlink (DL) configuration in a TDD communications system.

Once a DCI transmission is received by a UE, a particular RNTI may be used to descramble the CRC bits. If the descrambled CRC bits pass a CRC procedure ("CRC pass" in a "CRC check") for the received DCI transmission, then the DCI transmission may be identified as being associated with an RNTI of the particular type. In addition, the DCI transmission may include a codeword or payload, and once the UE has identified the transmission as being associated with an RNTI of a particular type, the DCI's codeword/payload may be used and/or interpreted as appropriate for that type of RNTI.

Descrambling the CRC is considered a low complexity operation as compared to the decoding of the DCI transmission itself. As a result, the introduction of a new RNTI may not significantly impact the resources required to decode the DCI associated with a new RNTI.

DCI may be used to decode associated DL transmissions on the physical downlink shared channel (PDSCH) and to encode associated UL transmissions on the physical uplink shared channel (PUSCH). DCI may also be used as a PHY layer mechanism for communicating with UEs. For example, DCI may be used to inform UEs of a change in system information (SI) or a change in TDD UL/DL configuration. DCI may additionally be used to establish UL transmit power control (TPC) for the PUSCH and the physical uplink control channel (PUCCH), through the use of the PUCCH-TPC-RNTI and the PUSCH-TPC-RNTI.

Table 1 below provides examples of the length in bits of codewords/payloads for DCI format 1C, depending on the system bandwidth over which the PDCCH carrying the DCI is transmitted. The number of bits of information that can be conveyed by re-using DCI format 1C and scrambling its CRC with a new RNTI may thus depend upon the system bandwidth of the carrier transmitting the DCI.

TABLE 1

| Codeword length (in bits) of LTE DCI format 1C | | | | | |
|---|---|---|---|---|---|
| 1.4 MHz | 3 MHz | 5 MHz | 10 MHz | 15 MHz | 20 MHz |
| 8 | 10 | 12 | 13 | 14 | 15 |

Figure 2:
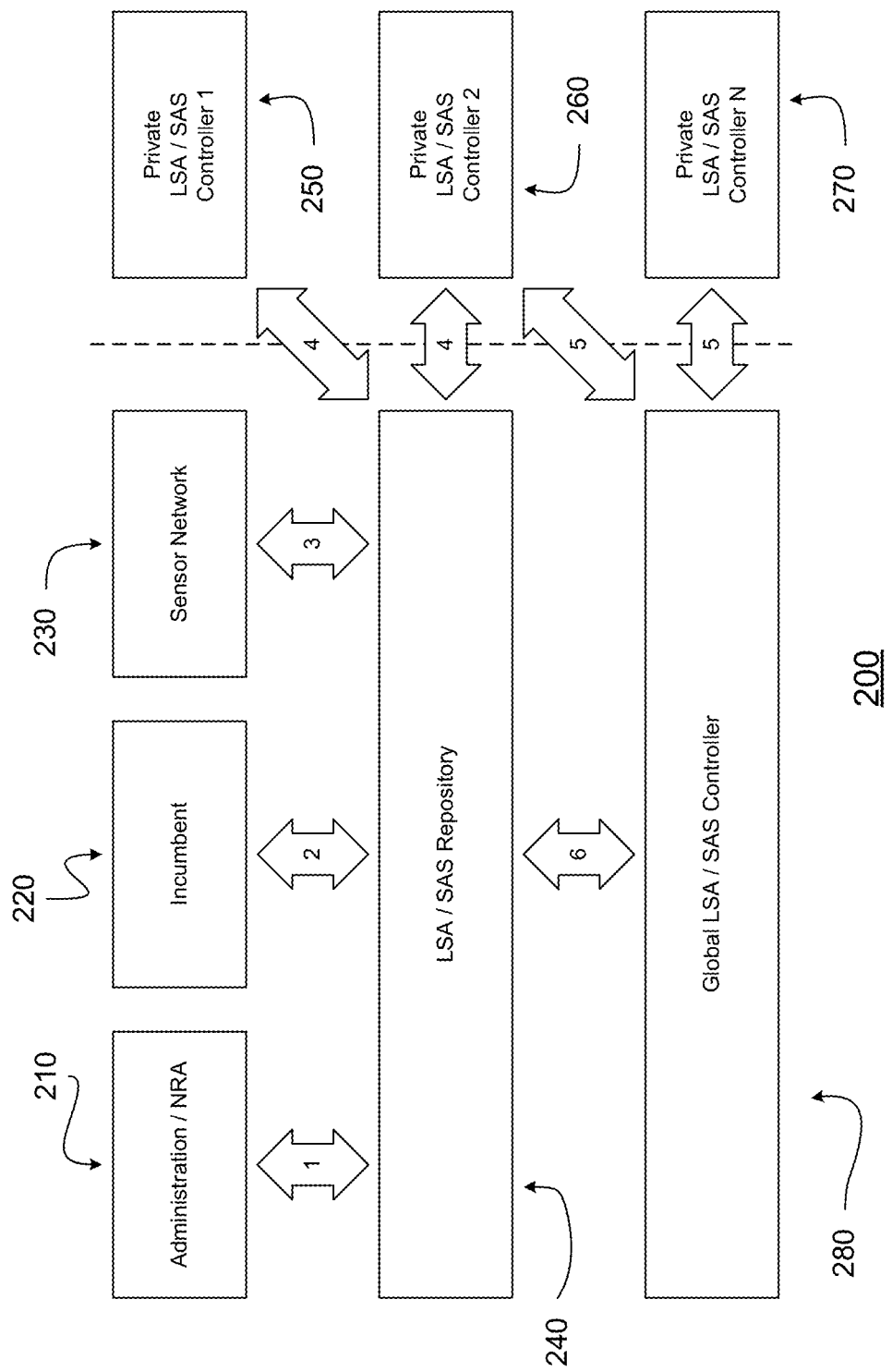
FIG. 2 illustrates an example of an LSA/SAS infrastructure, in accordance with some embodiments.

FIG. 2 illustrates an example of an LSA/SAS infrastructure, in accordance with some embodiments. An LSA/SAS infrastructure should accommodate incumbent-licensed users, auction-licensed users (e.g., PALs), and opportunistic or unlicensed users (e.g., GAA UEs), if present, on the same spectrum. An LSA/SAS infrastructure should accordingly be provisioned to promote and facilitate sufficient coordination among various users/licensees.

LSA/SAS infrastructure 200 may include an administration or national regulatory authority (NRA) 210, one or more incumbents 220, one or more sensor networks 230, an LSA/SAS repository (LR) 240, a first private LSA/SAS controller (LC) 250, a second private LC 260, an Nth private LC 270, and a global LC 280.

LR 240 may be populated by NRA 210, incumbents 220, or (in some instances) sensor network 230. LR 240 may be populated through various means. As a first example, NRA 210 may provide a national LSA framework to LR 240. Alternatively, an incumbent 220 may report current or planned usage of LSA spectrum directly to LR 240, or may detect violations and report them to the LR 240 if it chooses not to report current or planned usage of LSA spectrum to LR 240 (e.g., for reasons of national security). As a further example, a sensor network 230 may detect incumbent and PAL spectrum usage and report the usage to LR 240LR 240 may also provision various interfaces (along with associated protocols) for communicating with the various entities, such as an interface for communicating with NRA 210 (labeled "1"), an interface for communicating with incumbents 220 (labeled "2"), and/or an interface for communicating with sensor networks 230 (labeled "3").

Global LC 280 may be a centralized node. In comparison, an LC may be situated in the PAL or GAA domain, in which case the PAL or GAA may provision a private LC (such as first private LC 250, second private LC 260, or Nth private LC 270). Private LCs may be provisioned by PAL/GAA networks where a RAN exists to which a UE may connect. An example RAN for a PAL may be an MNO's LTE network, whereas an example RAN for GAA could be a carrier-grade or managed WiFi network, or a LAA LTE network. In some cases, unlicensed or unmanaged WiFi devices may access an LSA system as GAA UEs.

As depicted, LSA/SAS infrastructure 200 may include both a global LC and one or more private LCs. In addition, an LSA/SAS infrastructure 200 may include more than one global LC. LR 240 may accordingly have one or more interfaces (and associated protocols) for communicating with global LCs (labeled "6").

Private LCs may have defined interfaces (and associated protocols) for communicating with an LR, or a global LC, or both. In some embodiments, a PAL may connect with an LR, such as by an interface between first private LC 250 and LR 240 (labeled "4"). Similarly, GAA infrastructure may provision an interface and associated protocol to communicate with a global LC, such as by an interface between Nth private LC 270 and global LC 280 (labeled "5"). As a further alternative, a private LC may be disposed to communicate both with an LR and with a global LC, such as by interfaces between second private LC 260 and LR 240 (labeled "4"), and between second private LC 260 and global LC 280 (labeled "5"). Accordingly, in some embodiments, a PAL may merely have an interface with an LR (labeled "4"), and a GAA may merely have an interface with a global LC (labeled "5"), while an MNO may use LSA spectrum either as a PAL or under GAA.

Figure 3:
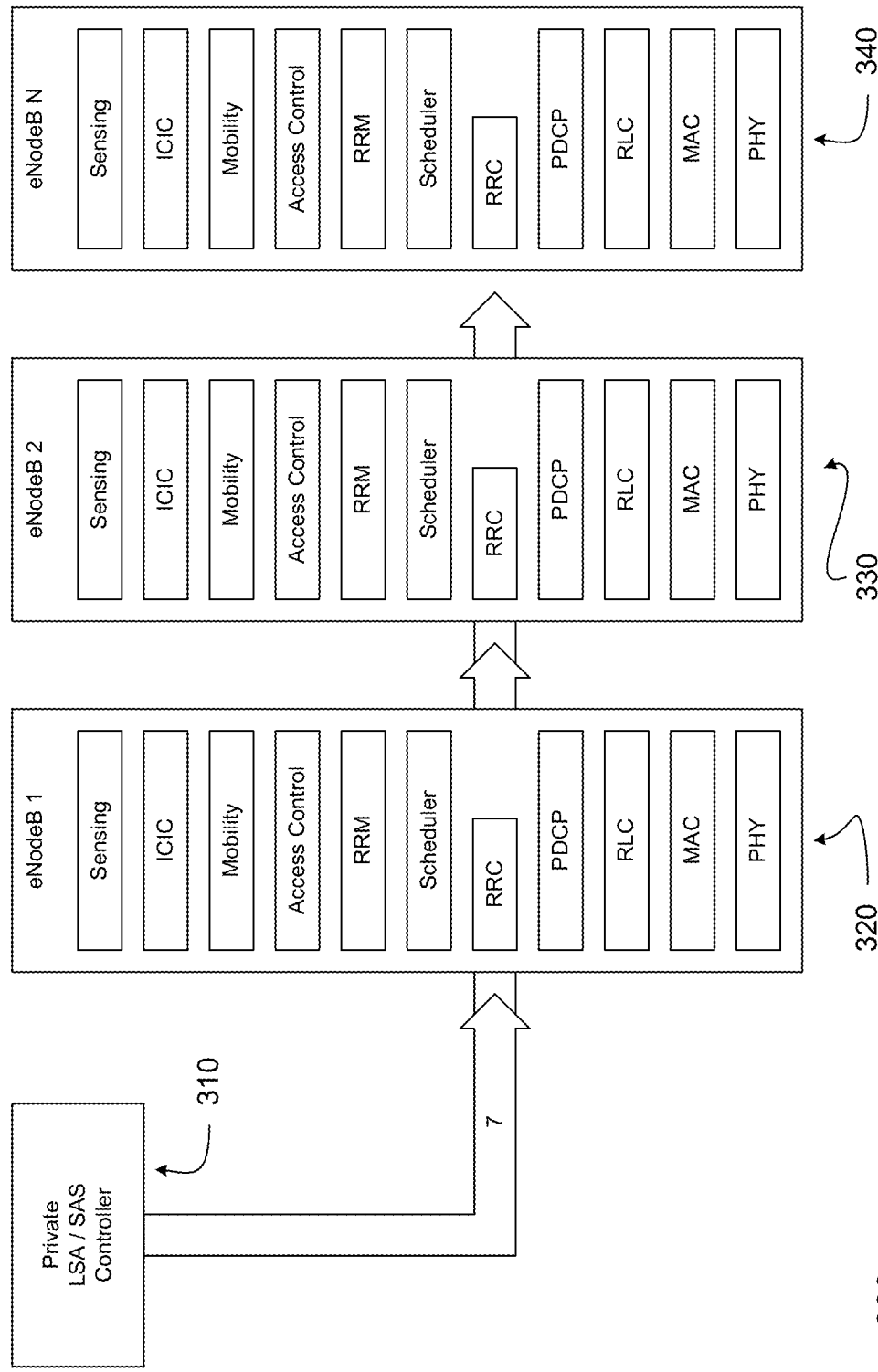
FIG. 3 illustrates an interface between a private LSA/SAS controller (LC) and base station protocol stacks and functions, in accordance with some embodiments.

FIG. 3 illustrates an interface between a private LSA/SAS controller (LC) and base station protocol stacks and functions, in accordance with some embodiments. Whether an MNO uses LSA spectrum either as a PAL or under GAA, it may provision sensing mechanisms in its RAN for incumbent protection (e.g., interference self-monitoring). When an MNO uses LSA spectrum under GAA, it may provision the same sensing mechanisms for PAL protection. As a result, a private LC may have an interface with one or more eNBs comprising the RAN of the private LC's MNO.

For example, an LSA system 300 may include a private LC 310, a first eNB 320, a second eNB 330, and an Nth eNB 340. Private LC 310 may have one or more interfaces (and associated protocols) with first eNB 320, second eNB 330, and/or Nth eNB 340 (labeled "7"). Each of first eNB 320, second eNB 330, and Nth eNB 340 may include various generic functions of the LTE standards, as well as various elements of the LTE protocol stack. Private LC 310 may be a logical node, and may be physically co-located with one or more of first eNB 320, second eNB 330, and/or Nth eNB 340. In various embodiments, LC 310 may accordingly physically reside in a variety of places, and could reside and/or otherwise be part of a RAN, a CN, or an MNO's operation and maintenance (OAM) infrastructure.

Figure 4:
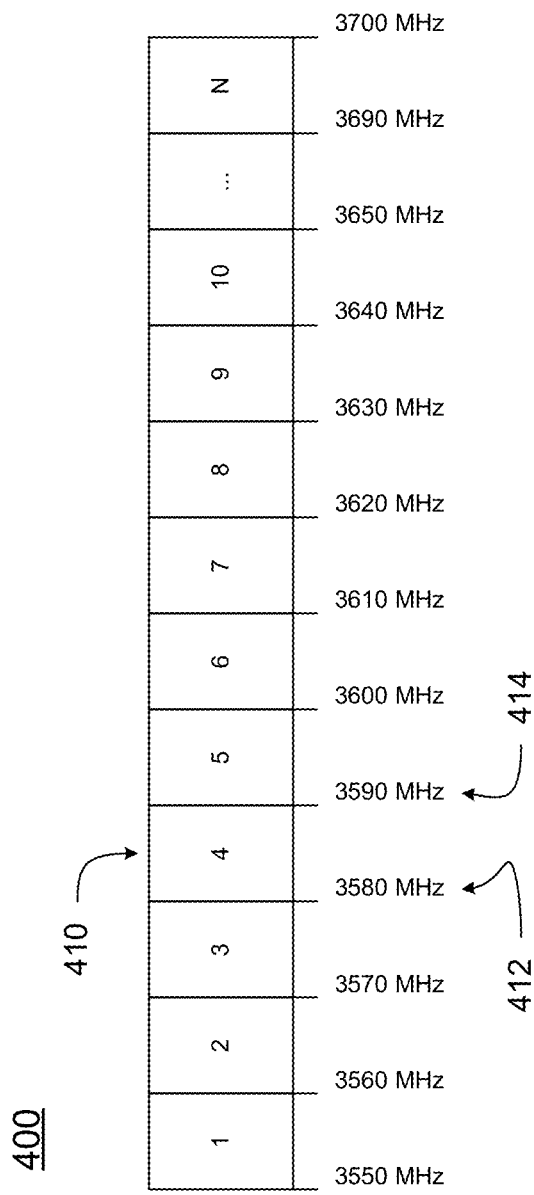
FIG. 4 illustrates a channelization of a 3.55-3.70 GHz spectrum in the United States, in accordance with some embodiments.

FIG. 4 illustrates a channelization of a 3.55-3.70 GHz spectrum in the United States, in accordance with some embodiments. An NRA may provision a licensing framework for an LSA system that assigns licenses covering dedicated frequency bands in dedicated geographical regions. For example, an NRA may subdivide an LSA spectrum 400 into a plurality of frequency bands/channels 410, each extending from a lower frequency 412 to a higher frequency 414. As depicted, LSA spectrum 400 extending from 3,550 MHz to 3,700 MHz has been channelized, or subdivided, into a plurality of 10 MHz frequency bands (labeled "1" through "N"), for a total of 150 MHz of channelized or subdivided frequencies. FIG. 4 may correspond to a SAS proposed by the FCC.

A license within LSA spectrum 400 may cover a specific range of frequencies, and may also cover a specific geographical region and/or a specific range of times. Such a license may accordingly be described by a tuple, or set, of parameters—frequency range, geographic range, and time range—and a license may cover a particular tuple of values for those parameters. Although frequency bands 410 are depicted as extending over 10 MHz, and are depicted as starting and stopping at specific frequencies, a license may cover any range of frequencies. Within the tuple of parameters of the license, a PAL or other licensee may use the covered portion of LSA spectrum 400 according to predefined rules possibly restricted to certain geographic regions and/or certain times.

Figure 5:
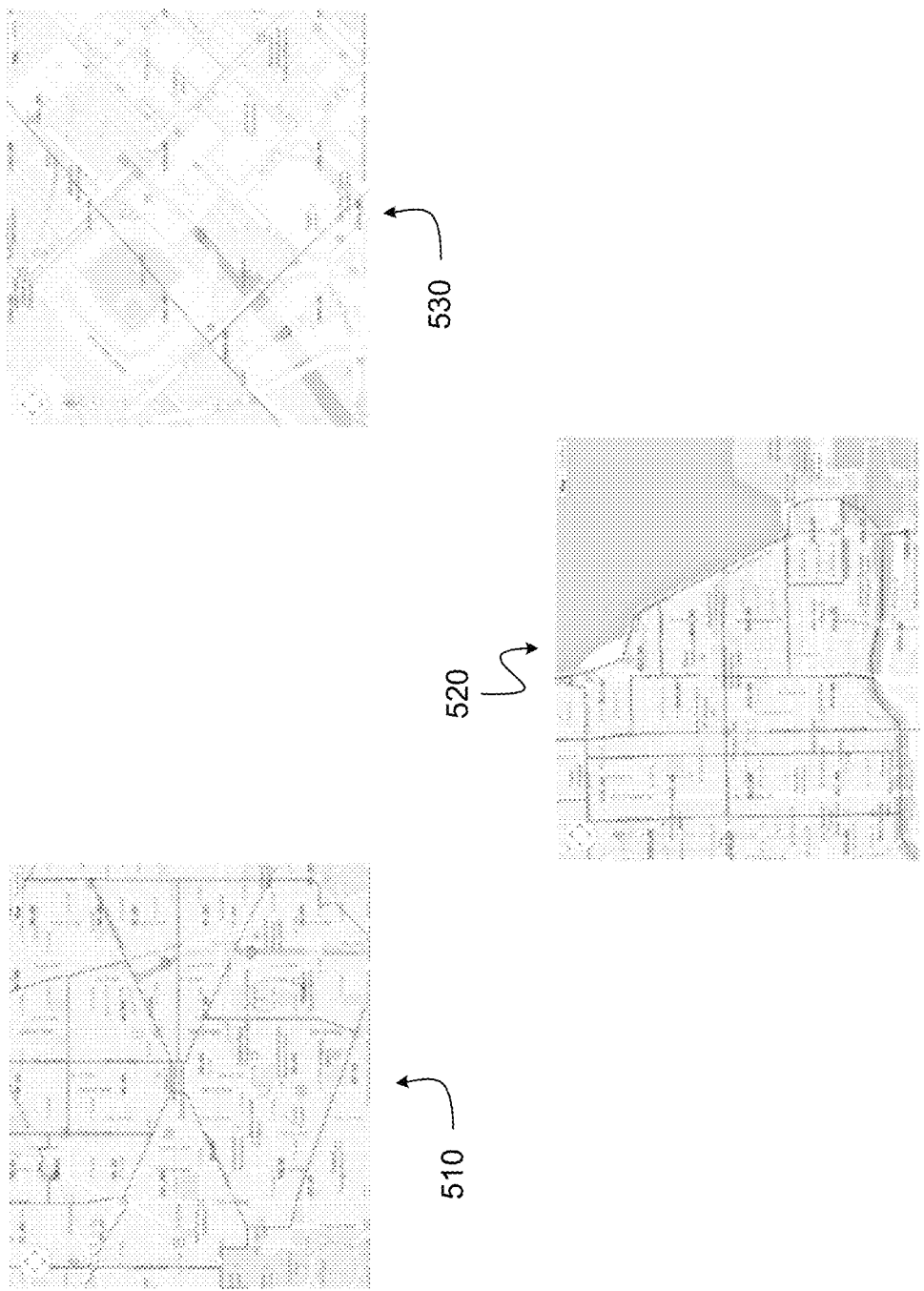
FIG. 5 illustrates a plurality of geographical regions, in accordance with some embodiments.

FIG. 5 illustrates a plurality of geographical regions, in accordance with some embodiments. FIG. 5 depicts a first census tract 510, a second census tract 520, and a third census tract 530. Each of first census tract 510, second census tract 520, and third census tract 530 may cover a specific geographical region, such as a U.S. census tract. A license within an LSA spectrum may cover one census tract, or a plurality of census tracts. Alternatively, in various embodiments, a license may cover any geographical region or regions.

Figure 6:
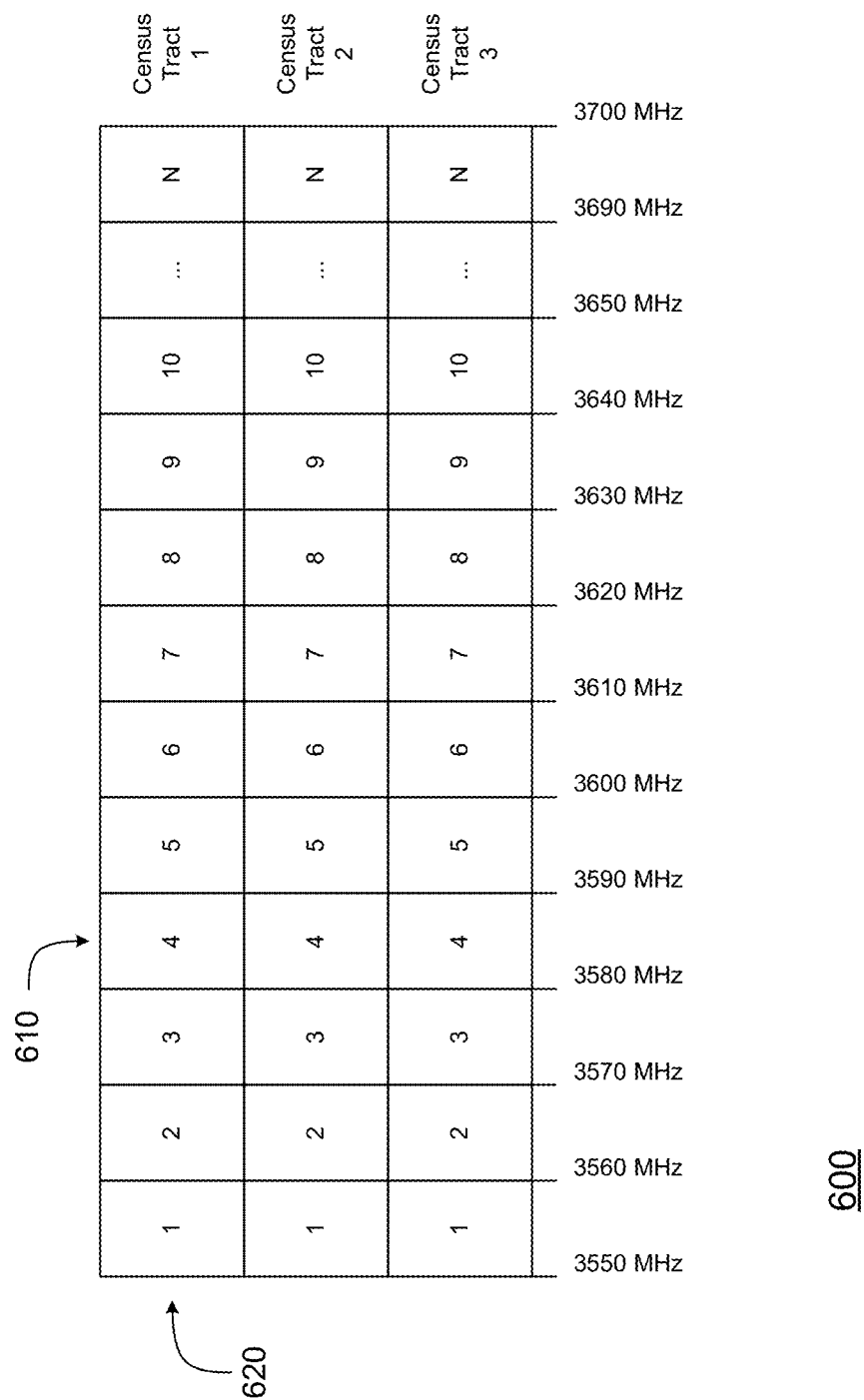
FIGS. 6-7 illustrate LSA licensing arrangements for a plurality of geographical regions, in accordance with some embodiments.
Figure 7:
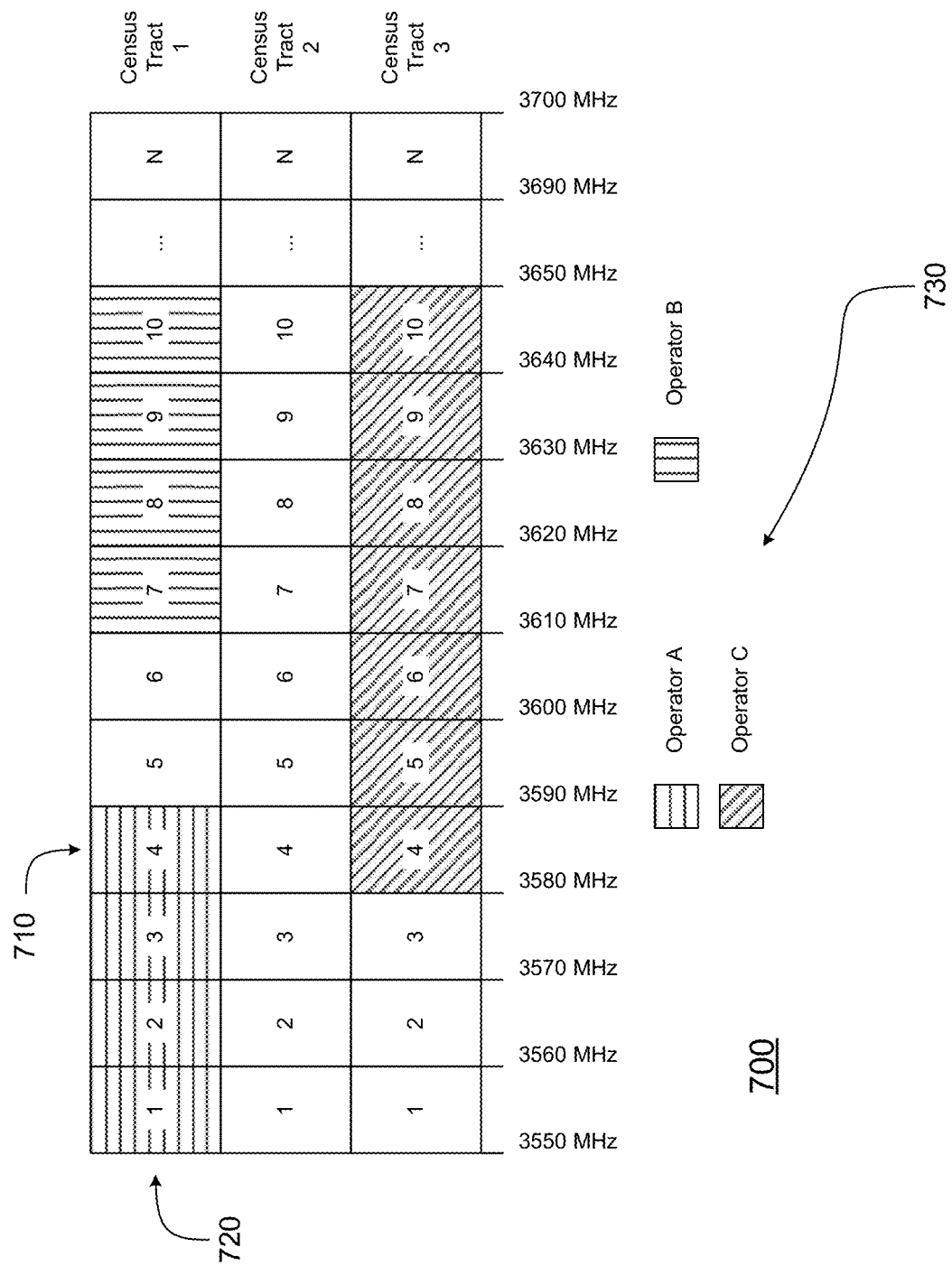

FIGS. 6-7 illustrate LSA licensing arrangements for a plurality of geographical regions, in accordance with some embodiments. As discussed above with respect to FIGS. 4 and 5, an LSA spectrum may be divided into any frequency ranges and any geographical regions. In FIG. 6, LSA spectrum 600 is subdivided into a plurality of frequency bands 610 for each of a plurality of census tracts 620. LSA spectrum 600 may be subdivided into formalized standard trading units (STUs) comprising a frequency band or channel, a geographical region, and a time period. Accordingly, frequency bands 610 may be adjacent to each other (in frequency), and census tracts 620 may be adjacent to each other (spatially). One or more STUs may then be assigned to a PAL for exclusive usage when there is no incumbent activity present, e.g., through an auction.

In the exemplary auctioning scheme of FIG. 7, LSA spectrum 700 (which may be substantially similar to LSA spectrum 600) may extend across a plurality of frequency bands 710 and a plurality of census tracts 720. PAL licenses to portions of LSA spectrum 700 have been assigned to a plurality of operators 730, specifically Operator A, Operator B, and Operator C. Operator A may have a license to frequency bands/channels 1 through 4 in Census Tract 1, Operator B may have a license to frequency bands/channels 7 through 10 in Census Tract 1, and Operator C may have a license to frequency bands/channels 4 through 10 in Census Tract 3.

In some embodiments, STUs licensed within LSA spectrum 700 may be separated by predefined guard bands, in frequency and/or spatially. Within Census Tract 1, the governing NRA has left the two STUs for frequency bands/channels 5 and 6 unassigned. Frequency bands/channels 5 and 6 may accordingly serve as a guard band, in frequency, between Operator A's licensed frequency bands/channels and Operator B's licensed frequency bands/channels. Similarly, the governing NRA has left Census Tract 2 unassigned, and Census Tract 2 may accordingly serve as a guard band, spatially, between Operators A and B in Census Tract 1 and Operator C in Census Tract 3.

In operation, in a three-tiered LSA system, some STUs may not be assigned to PALs, and may thereby be available for GAA use. GAA UEs may use such STUs, and may also use STUs that have been assigned to PALs but which are not currently being used.

A licensed PAL may refrain from using an STU for a variety of reasons. For example, an MNO may obtain a PAL license for increased capacity in an urban area such as an area around a sports arena or convention center, and may merely use the corresponding STUs during an event. As a further example, an MNO may obtain a PAL license covering a suburban or rural area, which may correspond to relatively larger census tracts, parts of which may not be used. Yet another example may be an MNO deploying small cell eNBs with low transmit power and low antenna height in various hotzones, such as business districts, shopping malls, or corporate facilities. In such cases, signal losses may occur due to poor penetration of surrounding buildings, especially for small cell eNBs deployed indoors. In these and other examples, significant parts of a licensed STU may be unused at any particular time, and may accordingly be available for re-use.

The operation of an LSA system with high QoS may have a variety of objectives: (1) protection of incumbent-licensed users from auction-licensed users (e.g., PALs); (2) protection of incumbent-licensed users from opportunistic or unlicensed users (e.g., GAA users); (3) protection of auction-licensed users (e.g., PALs) from opportunistic or unlicensed users (e.g., GAA users); and (4) protection of auction-licensed users (e.g., PALs) from other auction-licensed users (e.g., other PALs).

The first three objectives may lead to protection of higher priority users by lower priority users. However, the activity of higher-priority users may be effectively random, whether due to inherently stochastic data traffic or because a higher-priority user refrains from disclosing usage information (for example, due to confidentiality, privacy, or national security concerns). As a result, low-latency interaction with lower-priority users in response to transmission activity of higher-priority users may reduce interference which may otherwise be prolonged, and may thereby advantageously improve QoS for both lower-priority and higher-priority users.

For the fourth objective, guard-bands such as depicted in LSA spectrum 700 may protect other PALs, but the protection may come at the expense of spectral efficiency, since otherwise available STUs may be left unused. Accordingly, low-latency interaction in a LSA spectrum may advantageously permit licensing of PALs without inefficient guard-bands.

A new PHY layer signaling scheme for protecting higher-priority users in an LSA spectrum is discussed below. In this new scheme, an eNB may determine whether various STUs should become inactive (through sensing, or by being so informed). A new RNTI that scrambles the CRC of DCI is defined, which may be termed an LSA-RNTI. The LSA-RNTI may have an associated codeword/payload whose width is a function of the carrier's system bandwidth as discussed in Table 1 above (although for some embodiments, the width of the associated codeword/payload might not be a function of the carrier's system bandwidth per Table 1). This DCI codeword may be termed an LSA-RNTI codeword. The LSA-RNTI codeword may be a bitwise indicator of which STUs served by the eNB and/or configured at the UE are available for data transmission and/or reception.

In some embodiments, the bits in the LSA-RNTI codeword may correspond to component carriers (CCs). In some embodiments, the CCs may be sorted either in increasing or in decreasing order of a CC index. In turn, the index may be assigned to the CC when an eNB configures the CC as a secondary cell (SCell) for a given UE.

On the eNB side, CRC bits of a PDCCH transmission may be scrambled with the LSA-RNTI. On the UE side, the CRC bits of the PDCCH transmission may be descrambled with the LSA-RNTI. If the descrambled CRC bits match the CRC bits calculated for the transmission (e.g., the "CRC check" procedure yields a "CRC pass"), the transmission may be recognized as an LSA-RNTI bearing an LSA-RNTI codeword, which may indicate which STUs served by the eNB should be deactivated and/or which STUs served by the eNB should be activated.

An eNB may also use the LSA-RNTI codeword to cancel previously scheduled uplink transmissions at the UE. In addition, an eNB may also use the new LSA-RNTI to adjust spectral radiation mask or radio resource management (RRM) and channel state information (CSI) measurement procedures at the UE. Similarly, a UE may use the LSA-RNTI codeword to cancel previously scheduled uplink transmissions. In addition, a UE may use the new LSA-RNTI to adjust spectral radiation mask or radio resource management (RRM) and channel state information (CSI) measurement procedures.

Figure 8:
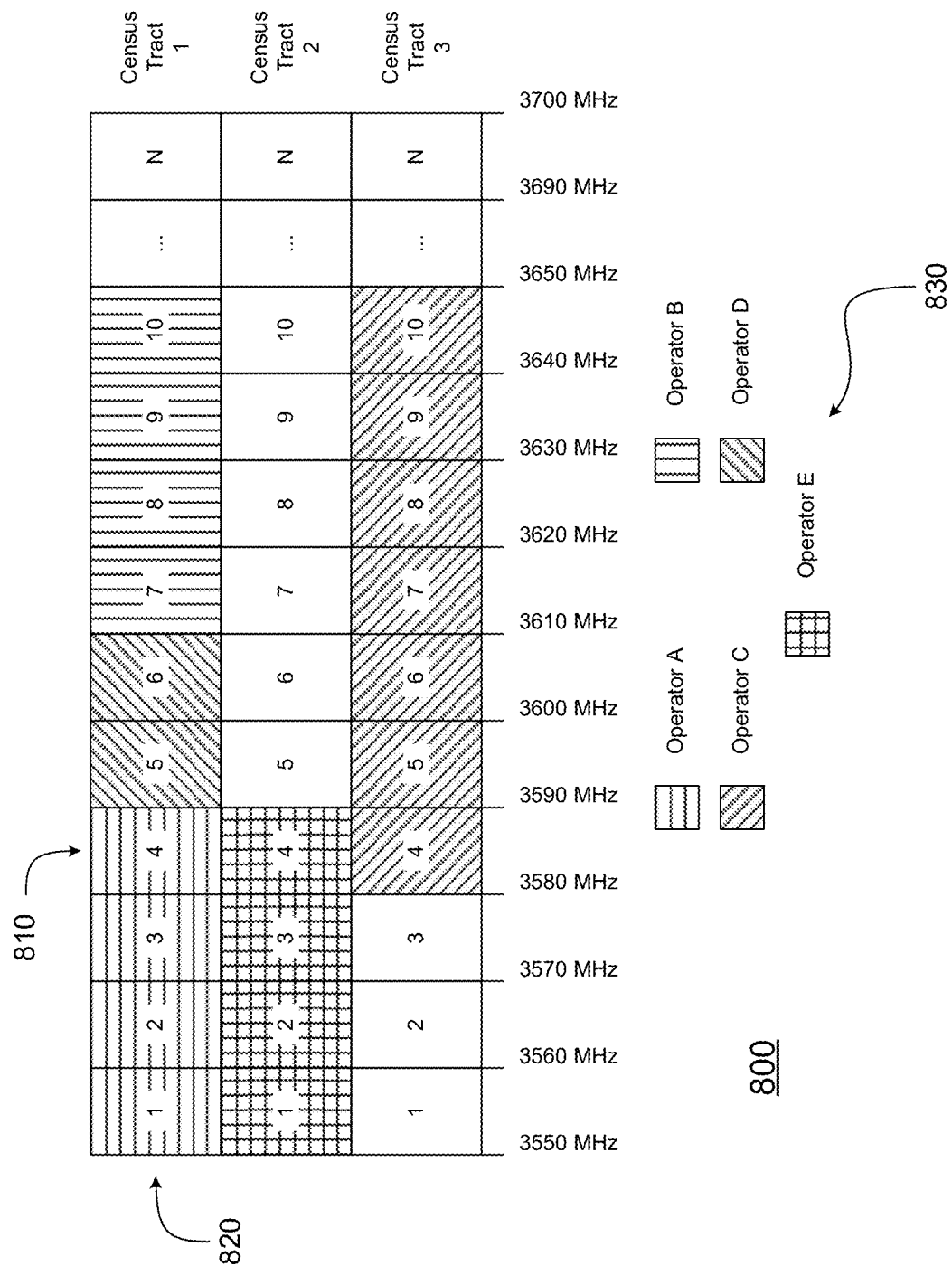
FIGS. 8-9 illustrate LSA licensing arrangements for a plurality of geographical regions and frequency bands/channels, in accordance with some embodiments.
Figure 9:
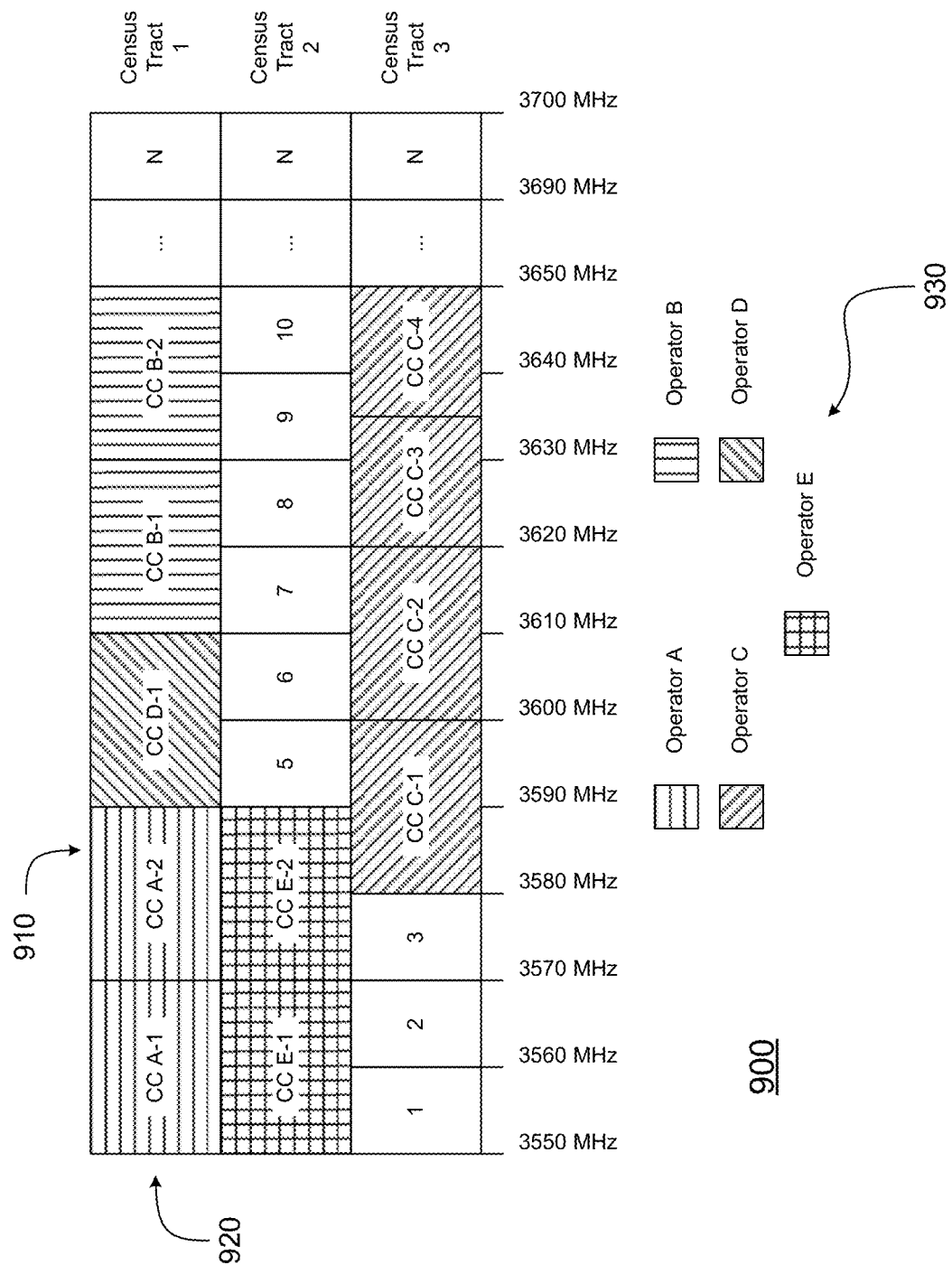

FIGS. 8-9 illustrate LSA licensing arrangements for a plurality of geographical regions and frequency bands/channels, in accordance with some embodiments. One or more MNOs may participate in an LSA system. Each MNO's RAN may include one or more eNBs possibly with sensing capabilities. If an eNB senses incumbent activity, such as by sensing power due to incumbent transmissions that exceeds a predetermined threshold, the eNB may signal to connected UEs to deactivate any conflicting STUs. Although the sensing capabilities of the eNB may be a function residing in the eNB, the actual measurements on which the sensing is based may be obtained either by the eNB, or by measurement reports transmitted by one or more UEs to the eNB. (While measurement reports in the latter case may not be due to physical acts of sensing happening at the eNB itself, they may still be considered part of the eNB's sensing capabilities.)

FIG. 8 depicts an LSA spectrum 800 that has been subdivided into STUs across a plurality of frequency bands 810 for each of a plurality of census tracts 820. In LSA spectrum 800, various STUs have been assigned to various operators 830. Some assignments are similar to those of LSA spectrum 700: Operator A may have a license to frequency bands/channels 1 through 4 in Census Tract 1; Operator B may have a license to frequency bands/channels 7 through 10 in Census Tract 1; and Operator C may have a license to frequency bands/channels 4 through 10 in Census Tract 3. However, in contrast with LSA spectrum 700, some guard bands (in frequency and spatially) between Operators A, B, and C in LSA spectrum 800 may be removed. Specifically, Operator D may have a license to frequency bands/channels 5 and 6 in Census Tract 1, and Operator E may have a license to frequency bands/channels 1 through 4 in Census Tract 2.

When one of operators 830 determines that one of its licensed STUs may be disposed to being deactivated to protect a higher-priority user (or user of same priority, respectively), the operator may map each of the channels/bands it serves to a corresponding bit in an LSA-RNTI codeword, scramble the CRC bits for the DCI with an LSA-RNTI, and transmit it to one or more UEs. For each bit in the codeword, one value (e.g., zero) may indicate that a corresponding band/channel should be inactivated, and another value (e.g., one) may indicate that the corresponding channel/band should be activated.

A UE receiving the DCI may unscramble its CRC with the LSA-RNTI. If the unscrambled CRC bits match the calculated CRC bits for the DCI (e.g., a "CRC check" procedure yields a "CRC pass"), the UE may use the bits in the LSA-RNTI codeword to determine whether any activated channel/band should be deactivated.

FIG. 9 depicts an LSA spectrum 900 in which STUs licensed to various operators have been mapped to various CCs. LSA spectrum 900 may be substantially similar to LSA spectrum 800, but various licensed STUs of LSA spectrum 900 have been mapped to CCs across a plurality of frequency bands 910 for each of a plurality of census tracts 920. Operators 930 may apportion their assigned STUs to CCs in various ways. In some cases, a CC may span a single STU. In other cases, a CC may span less than a single STU, or more than a single STU. As depicted, Operator A may operate two CCs of 20 MHz each (labeled "CC A-1" and "CC A-2"). Operator B may operate two CCs of 20 MHz each (labeled "CC B-1" and "CC B-2"). Operator C may operate two CCs of 20 MHz each (labeled "CC C-1" and "CC C-2"), and may also operate two CCs of 15 MHz each (labeled "CC C-3" and "CC C-4"). Operator D may operate one CC of 20 MHz (labeled "CC D-1"). Finally, Operator E may operate two CCs of 20 MHz each (labeled "CC E-1" and "CC E-2").

In some embodiments, the eNBs of the various operators 930 may interpret the bits of a received LSA-RNTI codeword as applying to the CCs they operate. The eNBs controlled by some operators 930 having one CC may interpret the first bit of the received LSA-RNTI codeword as being associated with its "−1" CC (such as Operator D). The eNBs controlled by some operators 930 having two CCs may interpret the first two bits of a received DCI codeword as being associated, in order, with its "−1" and "−2" CCs (such as Operators A, B, and E). The eNBs controlled by some operators 930 having four CCs may interpret the first four bits of a received DCI codeword as being associated, in order, with its "−1" through "−4" CCs (such as Operator C). An eNB may thus indicate an ordered list of required active/inactive states for to up to N CCs, where N is defined by the length of the codeword based upon the system bandwidth (see the example given in Table 1).

In some embodiments, the UEs connected to the various operators 930 may interpret the bits of a received LSA-RNTI codeword as applying to the CCs they are configured with. The UEs configured by eNBs of some operators 930 with one CC may interpret the first bit of the received LSA-RNTI codeword as being associated with its "−1" CC (such as Operator D). The UEs configured by eNBs of some operators 930 with two CCs may interpret the first two bits of a received DCI codeword as being associated, in order, with its "−1" and "−2" CCs (such as Operators A, B, and E). The UEs configured by eNBs of some operators 930 with four CCs may interpret the first four bits of a received DCI codeword as being associated, in order, with its "−1" through "−4" CCs (such as Operator C). An UE may thus interpret an ordered list of required active/inactive states for up to N CCs, where N is defined by the length of the codeword based upon the system bandwidth (see the example given in Table 1).

A UE may monitor the common search space in every DL subframe for a PDCCH having CRC scrambled by the LSA-RNTI. If the UE detects such a PDCCH transmission, the UE may activate and/or deactivate its RRC-configured CCs in accordance with an LSA-RNTI codeword as discussed above.

This signaling method may advantageously be common to all UEs having been configured by their higher layers to monitor for PDCCHs with CRC scrambled by an LSA-RNTI, whereas other signaling methods may rely on the MAC or RRC protocol layer and may be UE-specific. In addition, this signaling method may advantageously be transmitted directly in the PHY layer, which may permit a UE to apply the deactivation/activation status with minimal processing delays in comparison with processing delays inherent in the MAC or RRC protocol layers.

For example, if a PDCCH having CRC scrambled by the LSA-RNTI is received in a subframe n, a UE may deactivate (or activate) its CCs according to the corresponding LSA-RNTI codeword in subframe n+1. In addition, if a CC has been deactivated in a subframe n, and if a UL transmission has been scheduled for a subframe n+m on the deactivated CC (where m>0), a UE may ignore the corresponding UL grant.

In some embodiments, each bit of an LSA-RNTI codeword may correspond to an SCell. Furthermore, the primary cell (PCell) may be configured on traditional, exclusively-licensed spectrum instead of on an LSA spectrum. In such embodiments, for a PCell operating on 20 MHz of spectrum, and in accordance with the width of the codeword for DCI format 1C based up on the system bandwidth (as in Table 1 above), carrier aggregation (CA) with up to 15 SCells (of 20 MHz each) may be supported in LSA spectrum covering up to 300 MHz.

In some embodiments, a PCell may also be addressable by the LSA-RNTI codeword. If a bit in the codeword associated with the PCell indicates deactivation (e.g., if the bit becomes zero), since the PCell may not be subject to deactivation, the UE may respond in an alternate manner. The bit may instead trigger a radio link failure (RLF) at the UE, after which the UE may transmit a physical random access channel (PRACH) to another cell. The other cell may be a cell operated on traditional, exclusively-licensed spectrum instead of on an LSA spectrum, which may be indicated to the UE by its RRC configuration or by broadcasted SI. An advantage of indicating the other cell to the UE by RRC configuration may be that ping-pong effects may be reduced and robustness may be increased. Due to the expected association loss, this technique may be applied in rare instances, such as instances in which incumbent activity is expected to be very rare. Such embodiments may facilitate PCell operation in an LSA spectrum.

In some embodiments, GAA users may opportunistically attempt to transmit in STUs assigned to a PAL, in which the PAL is temporarily inactive. With respect to FIG. 9, for example, Operators A, B, and C may be PALs, whereas Operators D and E may instead operate under GAA. In such embodiments, GAA eNBs may use the mechanisms discussed above to protect PAL RANs by dynamically deactivating CCs, based upon sensed activity of higher-priority users.

Figure 10:
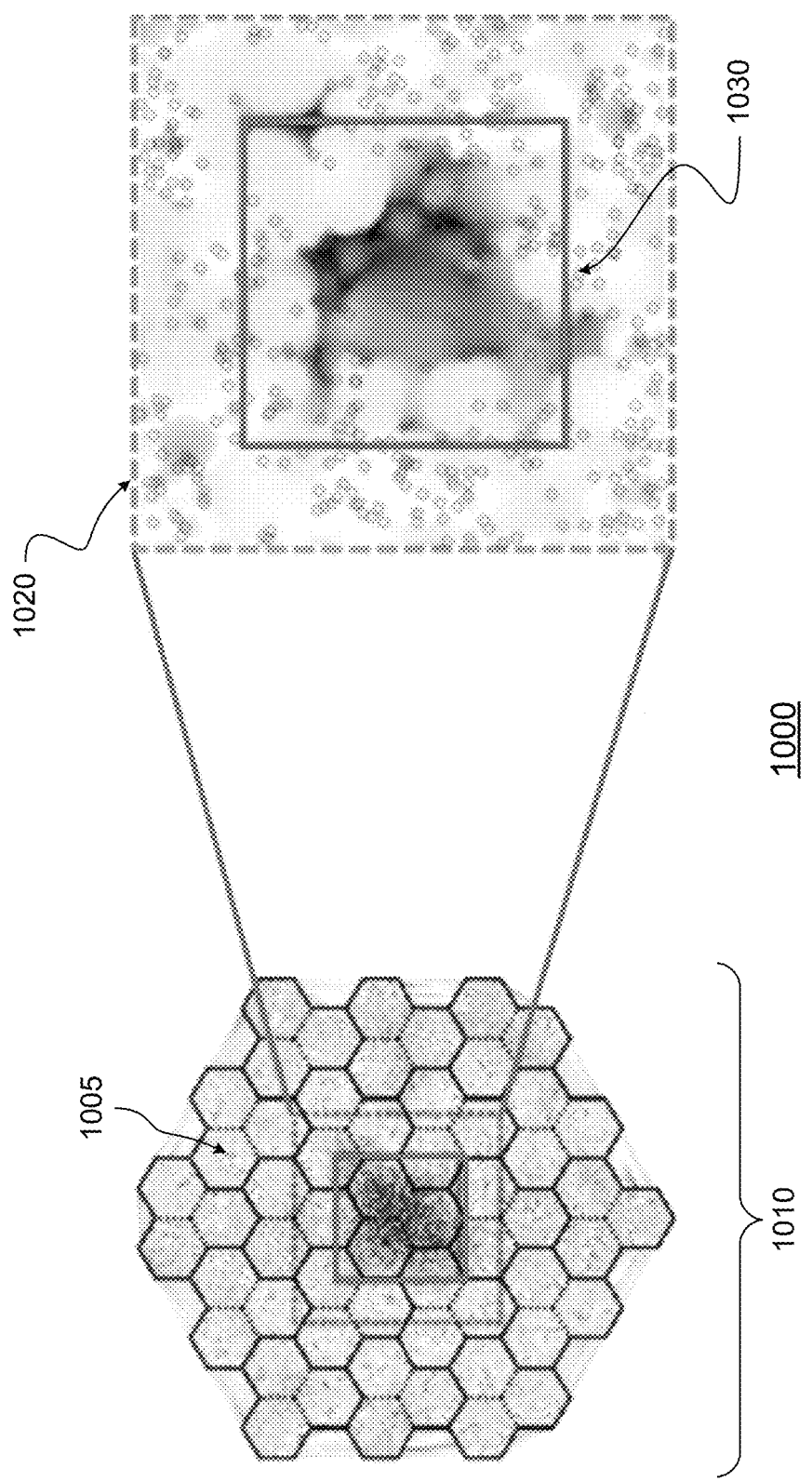
FIG. 10 illustrates a radio environment map (REM) estimation, in accordance with some embodiments.

In some embodiments, the values encoded in the bits of the LSA-RNTI codeword may not be established based upon an eNB's sensing of incumbent activity. Instead, the values may be established based upon an interference self-monitoring function, which may reside either in the eNB or in a separate note of the RAN, CN, or OAM infrastructure. For example, FIG. 10 illustrates a radio environment map (REM) estimation, in accordance with some embodiments. Map 1000 indicates aggregated interference 1005 in a geographic area 1010, as created by, for example, a wireless cellular communications network. Various eNBs within the network may receive Minimization-of-Drive-Test (MDT) reports, which may contain measurements reported by various UEs and tagged with geo-location information (e.g., GPS coordinates). Aggregated interference 1005 may be determined based upon MDT reports received from the various UEs, including UEs in an MDT zone 1020 within geographic area 1010

The wireless network may be operating in an LSA spectrum in which an incumbent may prohibit PAL activity in one or more STUs in an exclusion zone 1030, while permitting PAL activity outside exclusion zone 1030. A PAL may estimate the aggregated interference 1005 within exclusion zone 1030 (e.g., through interpolation). If interference 1005 within exclusion zone 1030 exceeds a predetermined threshold, the PAL may deactivate certain cells/bands/channels, through mechanisms such as those discussed above, in order to lower interference 1005 within exclusion zone 1030.

In various embodiments, SCells may follow activation and/or deactivation procedures in accordance with Release 10 of the LTE specifications. In the case of SCell activation, for example, if an eNB detects that a higher priority user has vacated an STU, it may begin transmitting primary synchronization signals and secondary synchronization signals (PSS/SSS), cell-specific reference signals (CRS), and (optionally) channel state information reference signals (CSI-RS) in that STU. The eNB may then send the PHY indicator associated with LSA-RNTI to activate the CCs associated with the vacated STUs, which may be sent on a cell in a different STU or on the PCell.

Upon receiving the indicator, the UE may tune its Radio Frequency (RF) circuitry to obtain time and frequency synchronization with the CC. The UE may perform automatic gain control (AGC), a discrete Fourier transform (DFT) of a received time-domain signal, and may estimate channel quality, which may then be reported to the eNB in a CSI report for the CC. Once the eNB receives a CSI report from a UE that does not indicate an out-of-range (OOR) condition, an eNB MAC scheduler may begin transmitting data to that UE on that CC.

In the case of a deactivation command, a UE may cease transmission of any scheduled uplink transmissions, as discussed above. The UE may then refrain from monitoring the search space for the deactivated CC.

In some embodiments, an LSI-RNTI may be broadcast in SI on a BCCH. In such embodiments, all UEs may have identical CA configurations, which may allow for unambiguous mapping of an LSA-RNTI codeword to the applicable CCs. In addition, other embodiments may configure LSA-RNTI in a UE-specific manner, for example during RRC connection setup or during RRC connection reconfiguration. An LSA-RNTI may also address UE groups corresponding to identical CA configurations, and an eNB may accordingly configure multiple LSA-RNTIs with different mappings of LSA-RNTI codeword bits to CCs, to support UE groups having different CA configurations. The network may thus advantageously serve UEs of different capabilities. For example, some UEs may merely support CA configurations of 2 CCs, whereas other UEs may be capable of supporting greater CA configuration, such as CA configurations up to 5 CCs, or CA configurations up to 32 CCs.

In some embodiments, an eNB may merely serve UEs in the RRC_CONNECTED state on cells in an LSA spectrum under complete control of the eNB. This may advantageously prevent UEs from "camping" on cells in an LSA spectrum. Such "camping" may be undesirable, because UEs in an RRC_IDLE mode may merely monitor a common search space during predetermined DRX occasions, and an eNB may not have an opportunity to timely signal UEs in an RRC_IDLE mode using DCI with CRC scrambled by the LSA-RNTI. Such "camping" may also undesirably result in UEs autonomously initiating PRACH transmissions, such as upon data arrival in a UE MAC buffer.

In some embodiments, UE behavior may be autonomous, and upon the UE detecting incumbent activity on a cell in licensed shared spectrum, the UE may trigger an RLF. Instead of trying to re-connect to the same cell, the UE may transmit a PRACH to another cell, which may be operated either on traditionally-licensed spectrum as indicated to the UE by its RRC configuration or by broadcast SI, or on spectrum indicated to be active in the most recently received LSA-RNTI codeword. Transmission of the PRACH to a cell operated on traditionally-licensed spectrum may advantageously avoid ping-pong effects and increase robustness. Moreover, before triggering the RLF and transmitting the subsequent PRACH, the UE may report the detection of ongoing incumbent activity on the corresponding CC to the eNB by sending the eNB a measurement report.

Mechanisms similar to those described above may also be used to gather RRM and CSI feedback in an LSA spectrum. If a UE is configured for RRM measurements on a particular CC, the UE may use the last received DCI with CRC scrambled by the LSA-RNTI to determine whether to perform the RRM measurements according to its RRM measurement configuration. In some embodiments, a UE may merely perform an RRM measurement on an SCell if the bit in the most recently received LSA-RNTI codeword indicated activation of that CC (e.g., if the bit corresponding to that CC had a value of "one"). This may allow an eNB to indicate, for each CC, whether the RAN is transmitting PSS/SSS/CRS, which may be collectively referred to as discovery reference signals (DRS), and which may be used by a UE to perform RRM measurements.

As a result, an eNB may dynamically transmit DRS on deactivated SCells, depending upon incumbent activity and/or PAL activity (in the case of GAA use), and may send the DRS to each UE. Since a UE may begin monitoring common search space and UE-specific search space for an activated SCell, a special-purpose LSA-RNTI may be configured, together with the RRM measurement itself, to distinguish activation and/or deactivation of CCs for the purpose of RRM measurements from actual SCell activation and/or deactivation.

In some embodiments, in order to reduce the time between an eNB sending an activation indicator and the eNB receiving a first valid CSI report from a given UE, the eNB may periodically transmit CSI-RS and/or a tracking reference signal (TRS) for UEs to maintain time and frequency synchronization, and to permit UEs to have accurate CSI more readily available when the eNB sends an indicator to activate a particular CC.

Accordingly, an eNB may configure a UE with certain reference signal (RS) configurations for each CC in an LSA spectrum. These RS configurations may instruct a UE about, for example, the time and/or frequency resources of an associated RS, or how to generate the associated RS sequences. The UE may assume eNB transmission of these RS according to its configuration with respect to the associated RS if the most recently received LSA-RNTI codeword indicated activation of that CC (e.g., if the bit corresponding to that CC had a value of "one"). As with the embodiments discussed above with respect to RRM measurement, a separate LSA-RNTI may be configured to separate indication of transmission of TRS and/or CSI-RS from actual SCell activation and/or deactivation.

Figure 11:
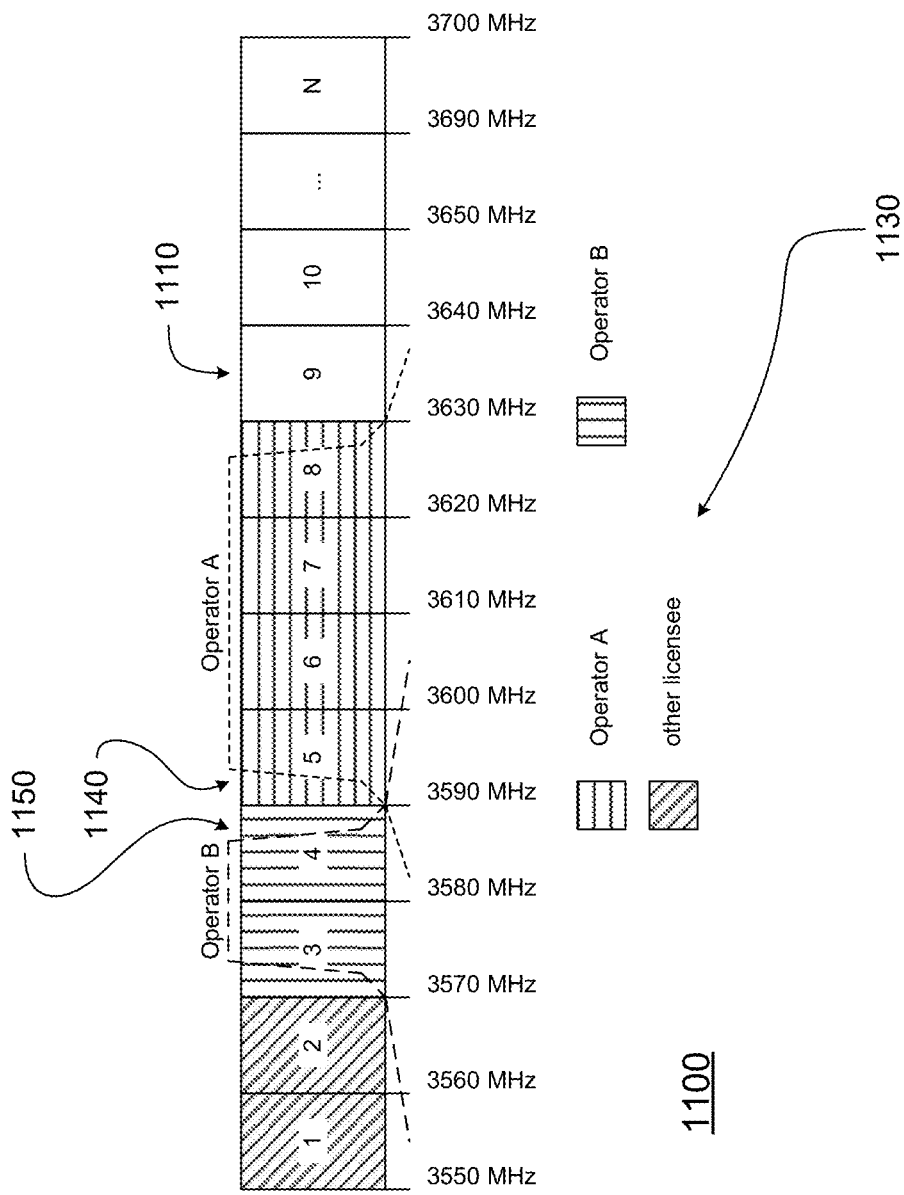
FIGS. 11-13 illustrate LSA licensing arrangements and associated spectral radiation masks, in accordance with some embodiments.
Figure 12:
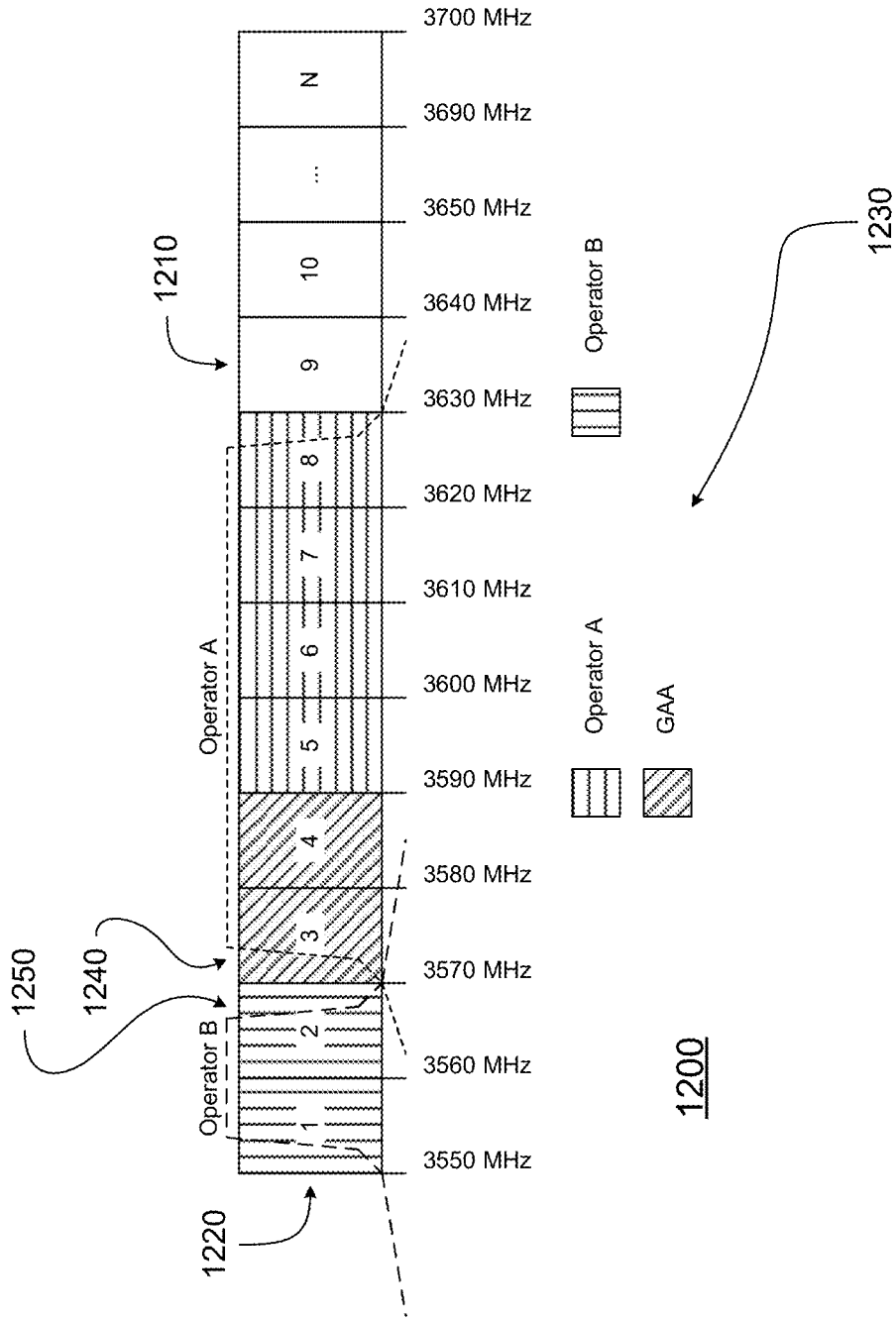
Figure 13:
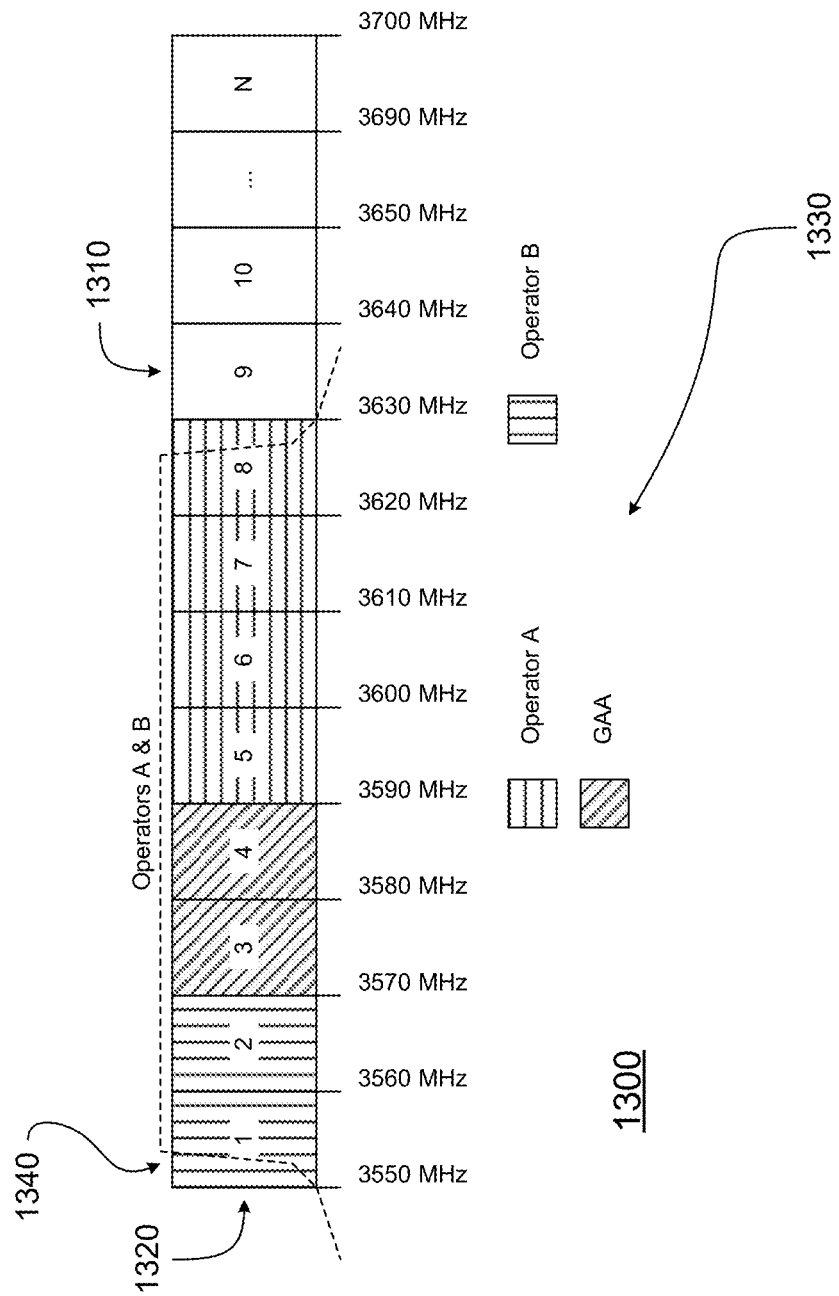

In some embodiments, such as embodiments directed toward next-generation radio access technologies (xRATs), an LSA system may assign portions of an LSA spectrum in accordance with one or more spectral radiation masks. FIGS. 11-13 illustrate LSA licensing arrangements and associated spectral radiation masks, in accordance with some embodiments.

In LTE, a system bandwidth may be fixed to a few sets of pre-defined sub-carrier sets which may be signaled in a Physical Broadcast Channel (PBCH). In the future, xRATs may no longer be based on orthogonal frequency division multiplexing (OFDM), but may instead be based on filtered OFDM (f-OFDM) or filter-band multi-carrier (FBMC) modulation. Such xRATs may have improved adjacent carrier leakage ratios (ACLRs) in comparison with LTE, and may allow for more flexible bandwidth deployments than LTE's few sets of pre-defined sub-carrier sets.

In some embodiments, which may include xRAT-based embodiments, the bits of the LSA-RNTI codeword may correspond not to CCs, but to STUs themselves. Accordingly, if the length of the LSA-RNTI codeword is N bits based upon the system bandwidth (in accordance with the example given in Table 1), an eNB may address N STUs. So, for example, the SAS system proposed for the United States may have fifteen 10 MHz STUs extending between 3,550 MHz and 3,700 MHz. With a PCell of 20 MHz in traditionally-licensed spectrum, the fifteen bits in an LSA-RNTI codeword for the PCell may address each STU in the SAS system.

In such LSA systems, a global LC may be tightly coordinated with private LCs of one or more PAL operators, which may facilitate efficient use of the LSA spectrum. Each PAL may communicate its current traffic load to the global LC through its private LC, and such reporting may be either triggered or periodic. The global LC may then, for each PAL, allocate a short-term license to a bundle of STUs. The short-term licenses may be mutually exclusive, such that one PAL at any time may have exclusive spectrum usage rights for any particular STU.

The improved ACLRs of an xRAT may permit licensing of STUs with less guard-band. With each short-term license, the global LC may assign a spectral radiation mask to a PAL, which could be computed as a function of the number of subcarriers covered by the STUs allocated to a PAL. For example, as depicted in FIG. 11, an LSA spectrum 1100 may include a plurality of STUs 1110 licensed to various operators 1130. Operator A may have a short-term license to STUs labeled 5 through 8, while Operator B may have a short-term license to STUs labeled 3 and 4. A first spectral mask 1140 assigned to Operator A may be computed as a function of the number of subcarriers covered by STUs 5 through 8. Similarly, a second spectral mask 1150 assigned to Operator B may be computed as a function of the number of subcarriers covered by STUs 3 and 4.

Dynamic allocation of spectral radiation masks based on allocated STUs may advantageously minimize unnecessary guard bands and thereby increase spectral efficiency of an LSA system. In a traditional LTE system, for example, a PAL allocated 4 STUs of 10 MHz each, for a total of 40 MHz of spectrum bandwidth, may operate on the 4 STUs by configuring two CCs of 20 MHz each, leaving unused subcarriers between the two 20 MHz CCs.

Each operator's private LC may propagate short-term licenses to a PAL's eNBs, which may then communicate the allocated STUs to UEs via an LSA-RNTI codeword. The use of PHY signaling in such embodiments may be advantageous for signaling efficiency.

In some embodiments, an eNB may transmit the PHY indicator (along with an LSA-RNTI codeword) in multiple subframes, which may advantageously increase the probability that the PHY indicator will be detected at a UE. A UE may then apply a detected STU allocation, based upon the LSA-RNTI codeword, at a predetermined modification period, which may depend upon the system frame number (SFN).

In some embodiments, a PAL may bundle one or more licensed STUs with one or more GAA STUs, thus advantageously minimizing unnecessary guard bands and increasing spectral efficiency of the LSA system. As depicted in FIG. 12, an LSA spectrum 1200 may include a plurality of STUs 1210 licensed to various operators 1230. Operator A may have a license to STUs labeled 5 through 8 (extending over 40 MHz), while Operator B may have a license to STUs labeled 1 and 2 (extending over 20 MHz). STUs 3 and 4 may be reserved for GAA use.

Operator A may detect that GAA STUs 3 and 4 are unused and available for transmission. Operator A may then bundle its PAL STUs 5 through 8 with GAA STUs 3 and 4, which may eliminate the guard band between STUs 4 and 5. First spectral mask 1240 of Operator A may accordingly be computed as a function of the number of subcarriers covered by STUs 3 through 8, while second spectral mask 1250 of Operator B may be computed as a function of the number of subcarriers covered by STUs 1 and 2.

In some embodiments, a global LC may be aware of a synchronization status of each PAL. The global LC may then assign a common spectral radiation mask for mutually synchronized operators in adjacent STU bundles, which may advantageously further reduce unnecessary guard bands between STUs of different operators. For example, mutual synchronization between operators (in time and frequency) may be achieved, for example, by GPS receivers at eNBs, through deployment of a synchronization protocol (e.g., IEEE 1588-2008 or IEEE 1588-2002), or via other radio-interface based synchronization (RIBS) techniques. As depicted in FIG. 13, an LSA spectrum 1300 may include a plurality of STUs 1310 licensed to various operators 1330, which may be mutually synchronized. Operator A may be allocated STUs 5 through 8, and Operator B may be allocated STUs 1 and 2, while STUs 3 and 4 may be reserved for GAA use. STUs may be allocated to Operators A and B based upon not only PAL traffic demand, but also a PAL's synchronization state. An LC may group operators that are mutually synchronized.

Operator A may accordingly have priority access to STUs 5 through 8, and may also opportunistically access STUs 1 through 4. Similarly, Operator B may have priority access to STUs 1 and 2, and may also opportunistically access STUs 3 through 8. A spectral mask 1340 for both Operator A and Operator B may accordingly be computed as a function of the number of subcarriers covered by STUs 1 through 8.

Operators A and B may each use their PAL STUs to transmit all necessary control signaling as well as common reference signals. For example, Operators A and B may each use their PAL STUs to transmit PSS/SSS/CRS/CSI-RS for coarse and/or fine time and frequency synchronization, AGC, CSI feedback, and so forth. Their PAL STUs may also be used to transmit legacy control channels (e.g., PDCCH, physical control format indicator channel (PCFICH), and/or physical hybrid-ARQ indicator channel (PHICH)). In comparison, GAA STUs may contain no cell-specific signals or channels (e.g., PSS/SSS, CRS, PDCCH, PCFICH, PHICH, and/or PBCH). PDSCH and the enhanced PDCCH (and/or EPDCCH) may start from OFDM symbol zero in a GAA resource.

For CSI-RS measurements in GAA resources, and potentially for RRM measurements, a UE may follow signaling in an LSA-RNTI codeword, with each bit corresponding to an STU. For example, an eNB may employ a carrier sensing/collision avoidance (CSCA) protocol for CSI-RS and/or DRS transmissions in a GAA resource. If the CSCA protocol determines that a GAA STU is idle (for example, through listen-before-talk (LBT) mechanisms), it may instruct the eNB to transmit CSI-RS and/or DRS in the GAA resource, and may instruct a UE to measure and report CSI and/or RRM measurements by also transmitting the PHY indicator with bits corresponding to the STUs of that GAA resources set to indicate activation (e.g., a value of "one").

In some embodiments, RAN sharing may accordingly be achieved by a global LC, with each MNO having its own RAN. In such embodiments, each operator may have a separate MAC scheduler, and spectrum may be shared via the semi-static allocation of STUs from a global LC.

Figure 14:
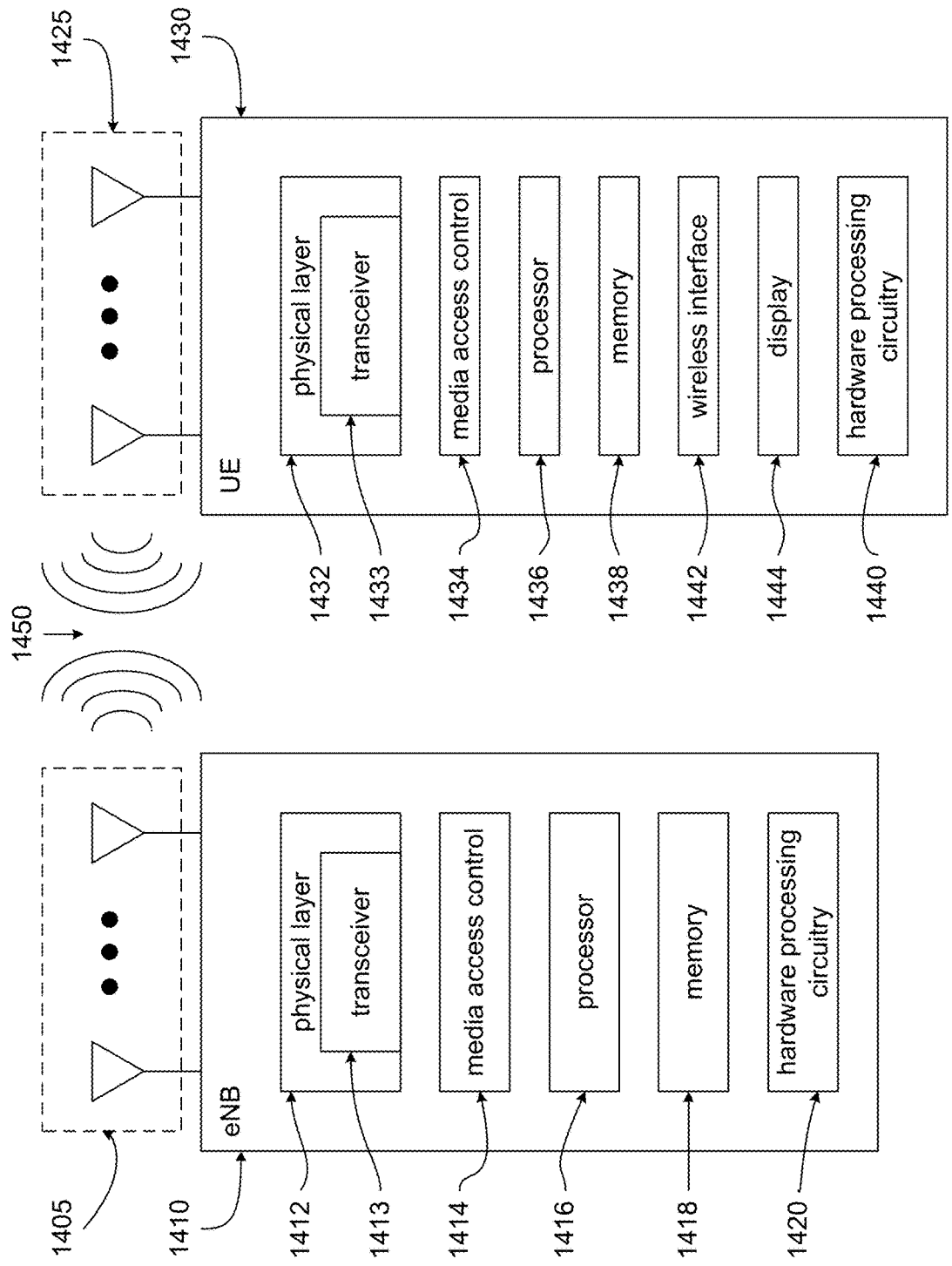
FIG. 14 illustrates an Evolved Node B (eNB) and a User Equipment (UE), in accordance with some embodiments.

FIG. 14 illustrates an Evolved Node B (eNB) and a User Equipment (UE), in accordance with some embodiments. FIG. 14 includes block diagrams of an eNB 1410 and a UE 1430 which are operable to co-exist with each other and other elements of a wireless cellular communications network. High-level, simplified architectures of eNB 1410 and UE 1430 are described so as not to obscure the embodiments. It should be noted that in some embodiments, eNB 1410 may be a stationary non-mobile device.

eNB 1410 is coupled to one or more antennas 1405, and UE 1430 is similarly coupled to one or more antennas 1425. However, in some embodiments, eNB 1410 may incorporate or comprise antennas 1405, and UE 1430 in various embodiments may incorporate or comprise antennas 1425.

In some embodiments, antennas 1405 and/or antennas 1425 may comprise one or more directional or omni-directional antennas, including monopole antennas, dipole antennas, loop antennas, patch antennas, microstrip antennas, coplanar wave antennas, or other types of antennas suitable for transmission of RF signals. In some MIMO (multiple-input and multiple output) embodiments, antennas 1405 are separated to take advantage of spatial diversity.

eNB 1410 and UE 1430 are operable to communicate with each other on a network, such as a wireless network. eNB 1410 and UE 1430 may be in communication with each other over a wireless communication channel 1450, which has both a downlink path from eNB 1410 to UE 1430 and an uplink path from UE 1430 to eNB 1410.

In some embodiments, eNB 1410 may be an Evolved Node-B or other base station operable within a wireless cellular communications system, such as a 3rd Generation Partnership Project (3GPP) Universal Mobile Telecommunications System (UMTS), a 3GPP Long-Term Evolution (LTE) system, a 3GPP LTE-Advanced system, or a $5^{th}$ Generation wireless system/$5^{th}$ Generation mobile networks (5G) system. Similarly, in some embodiments, UE 1430 may be a User Equipment or a mobile handset operable within a wireless cellular communications system, such as a 3GPP UMTS, a 3GPP LTE, a 3GPP LTE-Advanced system, or a 5G system As illustrated in FIG. 14, in some embodiments, eNB 1410 may include a physical layer circuitry 1412, a MAC (media access control) circuitry 1414, a processor 1416, a memory 1418, and a hardware processing circuitry 1420. A person skilled in the art will appreciate that other components not shown may be used in addition to the components shown to form a complete eNB.

In some embodiments, physical layer circuitry 1412 includes a transceiver 1413 for providing signals to and from UE 1430. Transceiver 1413 provides signals to and from UEs or other devices using one or more antennas 1405. In some embodiments, MAC circuitry 1414 controls access to the wireless medium. Memory 1418 may be, or may include, a storage media/medium such as a magnetic storage media (e.g., magnetic tapes or magnetic disks), an optical storage media (e.g., optical discs), an electronic storage media (e.g., conventional hard disk drives, solid-state disk drives, or flash-memory-based storage media), or any tangible storage media or non-transitory storage media. Hardware processing circuitry 1420 may comprise logic devices or circuitry to perform various operations. In some embodiments, processor 1416 and memory 1418 are arranged to perform the operations of hardware processing circuitry 1420, such as operations described herein with reference to logic devices and circuitry within eNB 1410 and/or hardware processing circuitry 1420.

As is also illustrated in FIG. 14, in some embodiments, UE 1430 may include a physical layer circuitry 1432, a MAC circuitry 1434, a processor 1436, a memory 1438, a hardware processing circuitry 1440, a wireless interface 1442, and a display 1444. A person skilled in the art would appreciate that other components not shown may be used in addition to the components shown to form a complete UE.

In some embodiments, physical layer circuitry 1432 includes a transceiver 1433 for providing signals to and from eNB 1410 (as well as other eNBs). Transceiver 1433 provides signals to and from eNBs or other devices using one or more antennas 1425. In some embodiments, MAC circuitry 1434 controls access to the wireless medium. Memory 1438 may be, or may include, a storage media/medium such as a magnetic storage media (e.g., magnetic tapes or magnetic disks), an optical storage media (e.g., optical discs), an electronic storage media (e.g., conventional hard disk drives, solid-state disk drives, or flash-memory-based storage media), or any tangible storage media or non-transitory storage media. Wireless interface 1442 may be arranged to allow the processor to communicate with another device. Display 1444 may provide a visual and/or tactile display for a user to interact with UE 1430, such as a touch-screen display. Hardware processing circuitry 1440 may comprise logic devices or circuitry to perform various operations. In some embodiments, processor 1436 and memory 1438 may be arranged to perform the operations of hardware processing circuitry 1440, such as operations described herein with reference to logic devices and circuitry within UE 1430 and/or hardware processing circuitry 1440.

Elements of FIG. 14, and elements of other figures having the same names or reference numbers, can operate or function in the manner described herein with respect to any such figures (although the operation and function of such elements is not limited to such descriptions). For example, FIGS. 15-16 and 22 also depict embodiments of eNBs, hardware processing circuitry of eNBs, UEs, and/or hardware processing circuitry of UEs, and the embodiments described with respect to FIG. 14 and FIGS. 15-16 and 22 can operate or function in the manner described herein with respect to any of the figures.

In addition, although eNB 1410 and UE 1430 are each described as having several separate functional elements, one or more of the functional elements may be combined and may be implemented by combinations of software-configured elements and/or other hardware elements. In some embodiments of this disclosure, the functional elements can refer to one or more processes operating on one or more processing elements. Examples of software and/or hardware configured elements include Digital Signal Processors (DSPs), one or more microprocessors, DSPs, Field-Programmable Gate Arrays (FPGAs), Application Specific Integrated Circuits (ASICs), Radio-Frequency Integrated Circuits (RFICs), and so on.

Figure 15:
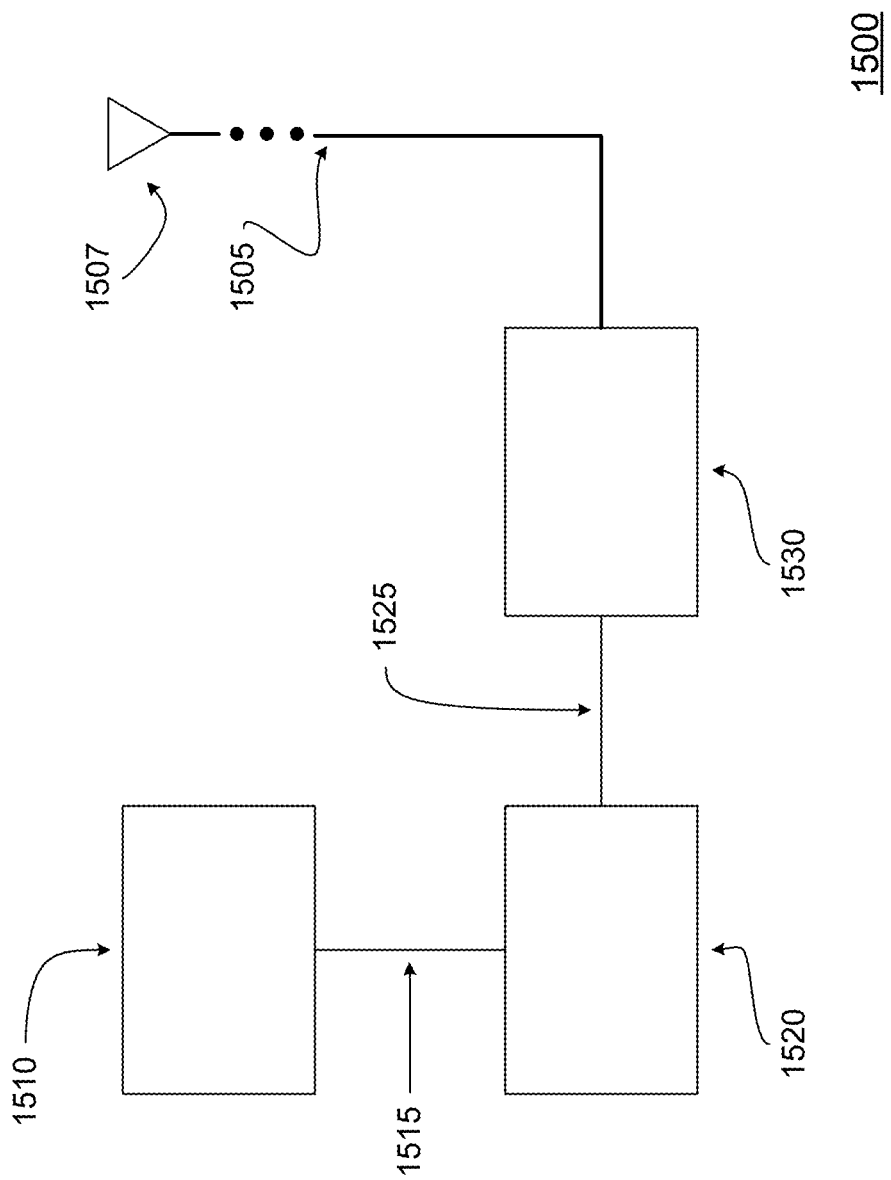
FIG. 15 illustrates a hardware processing circuitry for an eNB, in accordance with some embodiments.

FIG. 15 illustrates a hardware processing circuitry for an eNB, in accordance with some embodiments. A hardware processing circuitry 1500 may comprise logic devices and/or circuitry operable to perform various operations. For example, with reference to FIGS. 14 and 15, eNB 1410 (or various elements or components therein, such as hardware processing circuitry 1420, or combinations of elements or components therein) may include part of, or all of, hardware processing circuitry 1500. In some embodiments, processor 1416 and memory 1418 (and/or other elements or components of eNB 1410) may be arranged to perform the operations of hardware processing circuitry 1500, such as operations described herein with reference to devices and circuitry within hardware processing circuitry 1500. For example, one or more devices or circuits of hardware processing circuitry 1500 may be implemented by combinations of software-configured elements and/or other hardware elements.

In some embodiments, hardware processing circuitry 1500 may comprise one or more antenna ports 1505 operable to provide various transmissions over a wireless communication channel (such as wireless communication channel 1450). Antenna ports 1505 may be coupled to one or more antennas 1507 (which may be antennas 1405). In some embodiments, hardware processing circuitry 1500 may incorporate antennas 1507, while in other embodiments, hardware processing circuitry 1500 may merely be coupled to antennas 1507.

Antenna ports 1505 and antennas 1507 may be operable to provide signals from an eNB to a wireless communications channel and/or a UE, and may be operable to provide signals from a UE and/or a wireless communications channel to an eNB. For example, antenna ports 1505 and antennas 1507 may be operable to provide transmissions from eNB 1410 to wireless communication channel 1450 (and from there to UE 1430, or to another UE). Similarly, antennas 1507 and antenna ports 1505 may be operable to provide transmissions from a wireless communication channel 1450 (and beyond that, from UE 1430, or another UE) to eNB 1410.

With reference to FIG. 15, an apparatus of eNB 1410 (or another eNB or base station) may be operable to communicate with a UE on a wireless network, and may comprise hardware processing circuitry 1500. In some embodiments, the eNB (or other base station) may be a device comprising an application processor, a memory, one or more antenna ports, and an interface for allowing the application processor to communicate with another device.

Hardware processing circuitry 1500 may include circuitry and/or logic devices operable to provide PDCCH transmissions having CRC bits scrambled with an LSA-RNTI and bearing an LSA-RNTI codeword. In turn, the LSA-RNTI codeword may indicate a channel deactivation/activation status as discussed above. In various embodiments, an eNB (or other base station) comprising one or more processors may generate a plurality of channel status activation indicators. The eNB's processors may encode the plurality of indicators into a Downlink Control Information (DCI) codeword, may scramble the cyclic redundancy check bits of the DCI with a predetermined sequence, and may generate the DCI codeword to a UE as part of a DCI transmission on a physical control channel.

Hardware processing circuitry 1500 may comprise a first circuitry 1510, a second circuitry 1520, and a third circuitry 1530. First circuitry 1510 may be operable to provide a plurality of channel/CC status activation indicators 1515. Each channel/CC status activation indicator 1515 may correspond to activation/deactivation channel/CC status for one wireless communication channel, such as a CC. Moreover, the circuitries and procedures described herein with respect to channels may also be applicable with respect to CCs. In some embodiments, each channel/CC status activation indicator 1515 may correspond to activation/deactivation channel/CC status for one or more STUs in an LSA system, or for one or more frequency bands in an LSA spectrum. eNB 1410 may determine each activation/deactivation channel/CC status by sensing interference or other activity on a channel/CC. In some embodiments, eNB 1410 may sense interference or other activity by receiving reports, such as measurement reports from a UE, or reports from another component of a RAN comprising eNB 1410.

Second circuitry 1520 may be operable to encode channel/CC status activation indicators 1515 into an LSA-RNTI codeword 1525. In some embodiments, second circuitry 1520 may be operable to scramble a plurality of CRC bits of a DCI transmission with a predetermined bit sequence. In such embodiments, the predetermined bit sequence may specify a channel/CC activation-and-deactivation RNTI, such as the LSA-RNTI discussed above.

Third circuitry 1530 may be operable to transmit LSA-RNTI codeword 1525 to a UE as part of a DCI transmission. For example, third circuitry 1530 may provide LSA-RNTI codeword 1525 to antenna ports 1505 and/or antennas 1507 as part of a DL transmission over a wireless communication channel/CC. In some embodiments, the DCI transmission may be a PDCCH transmission. In some embodiments, the format of the DCI transmission may be Format 1C.

In some embodiments, first circuitry 1510, second circuitry 1520, and third circuitry 1530 may be implemented as separate circuitries. In other embodiments, one or more of first circuitry 1510, second circuitry 1520, and third circuitry 1530 may be combined and implemented together in a circuitry without altering the essence of the embodiments. In various embodiments, processor 1416 (and/or one or more other processors which eNB 1410 may comprise) may be arranged to perform the operations of first circuitry 1510, second circuitry 1520, and/or third circuitry 1530. In such embodiments, first circuitry 1510, second circuitry 1520, and/or third circuitry 1530 may accordingly be implemented by various combinations of software-configured elements (e.g., processor 1416, and/or one or more other processors) and/or other hardware elements. In various embodiments, processor 1416 (and/or one or more other processors which eNB 1410 may comprise) may be a baseband processor.

Figure 16:
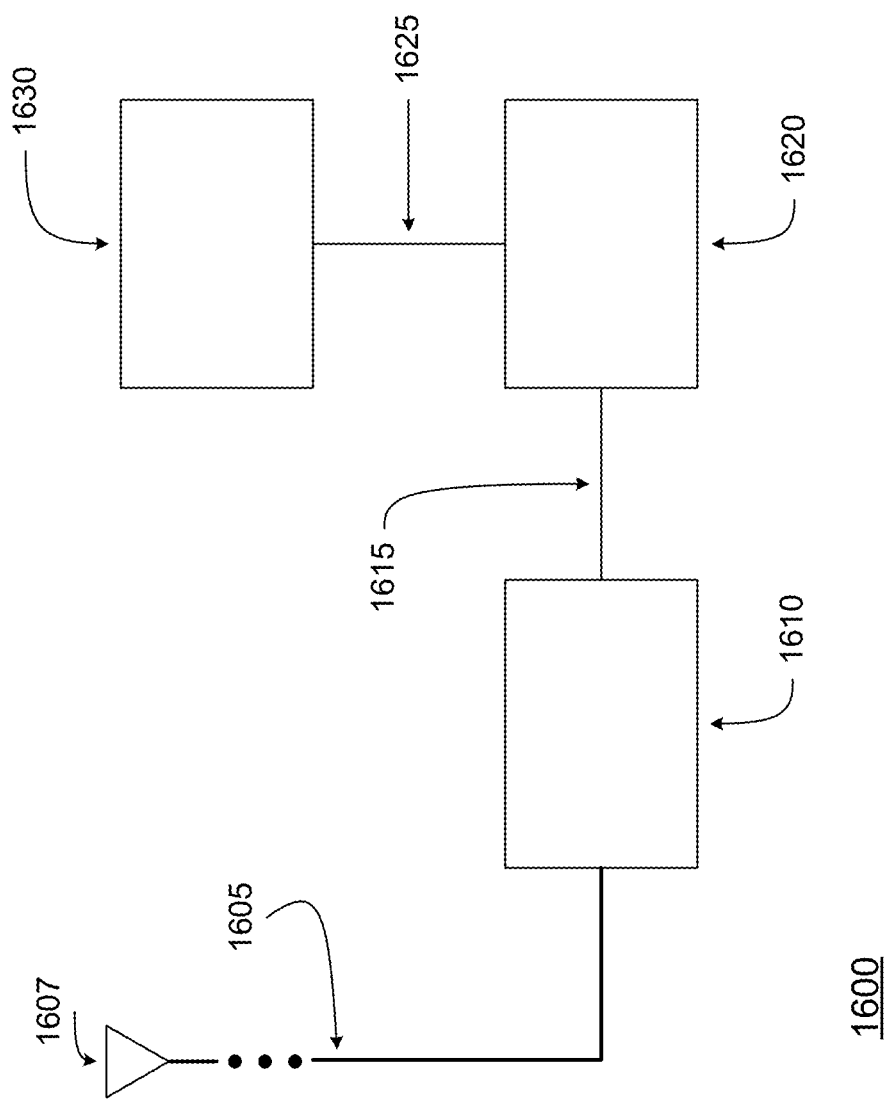
FIG. 16 illustrates hardware processing circuitry for a UE, in accordance with some embodiments.

FIG. 16 illustrates a hardware processing circuitry for a UE, in accordance with some embodiments. A hardware processing circuitry 1600 may comprise logic devices and/or circuitry operable to perform various operations. For example, with reference to FIGS. 14 and 16, UE 1430 (or various elements or components therein, such as hardware processing circuitry 1440, or combinations of elements or components therein) may include part of, or all of, hardware processing circuitry 1600. In some embodiments, processor 1436 and memory 1438 (and/or other elements or components of UE 1430) may be arranged to perform various operations of hardware processing circuitry 1600, such as operations described herein with reference to devices and circuitry within hardware processing circuitry 1600. For example, one or more devices or circuits of hardware processing circuitry 1600 may be implemented by combinations of software-configured elements and/or other hardware elements.

In some embodiments, hardware processing circuitry 1600 may comprise one or more antenna ports 1605 operable to provide various transmissions over a wireless communication channel (such as wireless communication channel 1450). Antenna ports 1605 may be coupled to one or more antennas 1607 (which may be antennas 1405). In some embodiments, hardware processing circuitry 1600 may incorporate antennas 1607, while in other embodiments, hardware processing circuitry 1600 may merely be coupled to antennas 1607.

Antenna ports 1605 and antennas 1607 may be operable to provide signals from a UE to a wireless communications channel and/or an eNB, and may be operable to provide signals from an eNB and/or a wireless communications channel to a UE. For example, antenna ports 1605 and antennas 1607 may be operable to provide transmissions from UE 1430 to wireless communication channel 1450 (and from there to eNB 1410, or to another eNB). Similarly, antennas 1607 and antenna ports 1605 may be operable to provide transmissions from a wireless communication channel 1450 (and beyond that, from eNB 1410, or another eNB) to UE 1430.

With reference to FIG. 16, an apparatus of UE 1430 (or another UE or mobile handset) may be operable to communicate with an eNB on a wireless network, and may comprise hardware processing circuitry 1600. In some embodiments, the UE (or other mobile handset) may be a device comprising an application processor, a memory, one or more antennas, a wireless interface for allowing the application processor to communicate with another device, and a touch-screen display.

Hardware processing circuitry 1600 may include circuitry and/or logic devices operable to process PDCCH transmissions having CRC bits scrambled with an LSA-RNTI and bearing an LSA-RNTI codeword. In turn, the bits of the LSA-RNTI codeword may indicate channel/CC deactivation/activation status as discussed above. In various embodiments, a UE (or other mobile handset) comprising one or more processors may process a DCI transmission from an eNB, the DCI transmission including a DCI codeword. The UE's processors may decode a plurality of channel status activation indicators from the DCI codeword, may check if the cyclic redundancy bits of the DCI are scrambled with a predetermined sequence, and may trigger a plurality of physical layer activation-and-deactivation circuitries based on the plurality of channel status activation indicators.

Hardware processing circuitry 1600 may comprise a first circuitry 1610, a second circuitry 1620, and a third circuitry 1630. First circuitry 1610 may be operable to receive a DCI transmission from eNB 1410 (or another base station). DCI transmission may be a PDCCH transmission. The format of DCI transmission may be Format 1C, and DCI transmission 1615 may include an LSA-RNTI codeword.

Second circuitry 1620 may be operable to decode a plurality of channel/CC status activation indicators 1625 from the LSA-RNTI codeword. Each channel/CC status activation indicator 1625 may correspond to activation/deactivation channel/CC status for one wireless communication channel, such as a CC. Moreover, the circuitries and procedures described herein with respect to channels may also be applicable with respect to CCs. In some embodiments, second circuitry 1620 may be operable to descramble a plurality of CRC bits of DCI transmission 1615 with a predetermined bit sequence. In such embodiments, the predetermined bit sequence may specify an activation-and-deactivation Radio Network Temporary Identifier (RNTI), such as the LSA-RNTI discussed above.

Third circuitry 1630 may be operable to trigger a plurality of physical layer activation-and-deactivation circuitries based on channel/CC status activation indicators 1625. In some embodiments, third circuitry 1630 may be operable to trigger a physical layer activation-and-deactivation circuitry to initiate an activation sequence for a particular channel/CC when the channel/CC status activation indicator 1625 corresponding to that particular channel/CC has a value of "one." In some embodiments, third circuitry 1630 may be operable to trigger a physical layer activation-and-deactivation circuitry to initiate a deactivation sequence for a particular channel/CC when the channel/CC status activation indicator 1625 corresponding to that particular channel/CC has a value of "zero." (In some embodiments, the interpretations given to values of "one" and "zero" may be reversed.)

In some embodiments, first circuitry 1610, second circuitry 1620, and third circuitry 1630 may be implemented as separate circuitries. In other embodiments, one or more of first circuitry 1610, second circuitry 1620, and third circuitry 1630 may be combined and implemented together in a circuitry without altering the essence of the embodiments. In various embodiments, processor 1436 (and/or one or more other processors which UE 1430 may comprise) may be arranged to perform the operations of first circuitry 1610, second circuitry 1620, and/or third circuitry 1630. In such embodiments, first circuitry 1610, second circuitry 1620, and/or third circuitry 1630 may accordingly be implemented by various combinations of software-configured elements (e.g., processor 1436, and/or one or more other processors) and/or other hardware elements. In various embodiments, processor 1436 (and/or one or more other processors which UE 1430 may comprise) may be a baseband processor.

Figure 17:
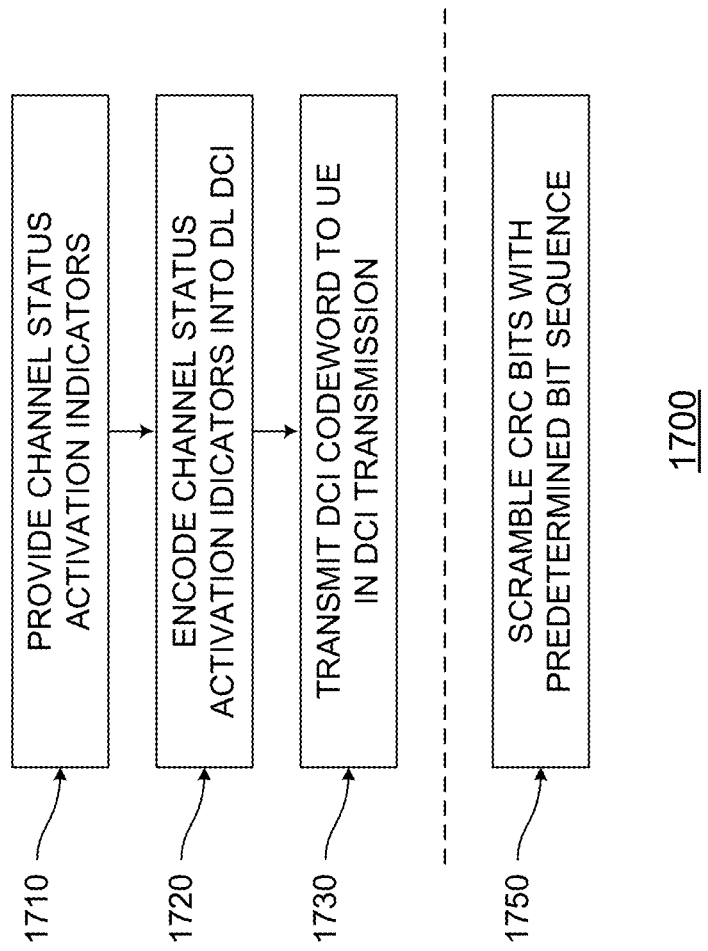
FIG. 17 illustrates methods for an eNB to support physical-layer-based CC or channel activation in LSA systems, in accordance with some embodiments.

FIG. 17 illustrates methods for an eNB to support physical-layer-based CC or channel activation in LSA systems, in accordance with some embodiments. Method 1700 may comprise a provision 1710, an encoding 1720, and a transmission 1730. In provision 1710, a plurality of channel/CC status activation indicators may be provided for an eNB (or other base station). In encoding 1720, the plurality of channel/CC status activation indicators may be encoded into an LSA-RNTI codeword. In transmission 1730, the LSA-RNTI codeword may be transmitted to a UE (or other mobile handset) as part of a DCI transmission.

In some embodiments, the DCI transmission may be a PDCCH transmission. In some embodiments, a format of the DCI transmission may be Format 1C. In some embodiments, the DCI transmission may have CRC scrambled with an RNTI, such as the LSA-RNTI discussed above.

In some embodiments, method 1700 may comprise a scrambling 1750. In scrambling 1750, a plurality of CRC bits of the DCI transmission may be scrambled with a predetermined bit sequence. In such embodiments, the predetermined bit sequence may be an RNTI, such as the LSA-RNTI discussed above.

Figure 18:
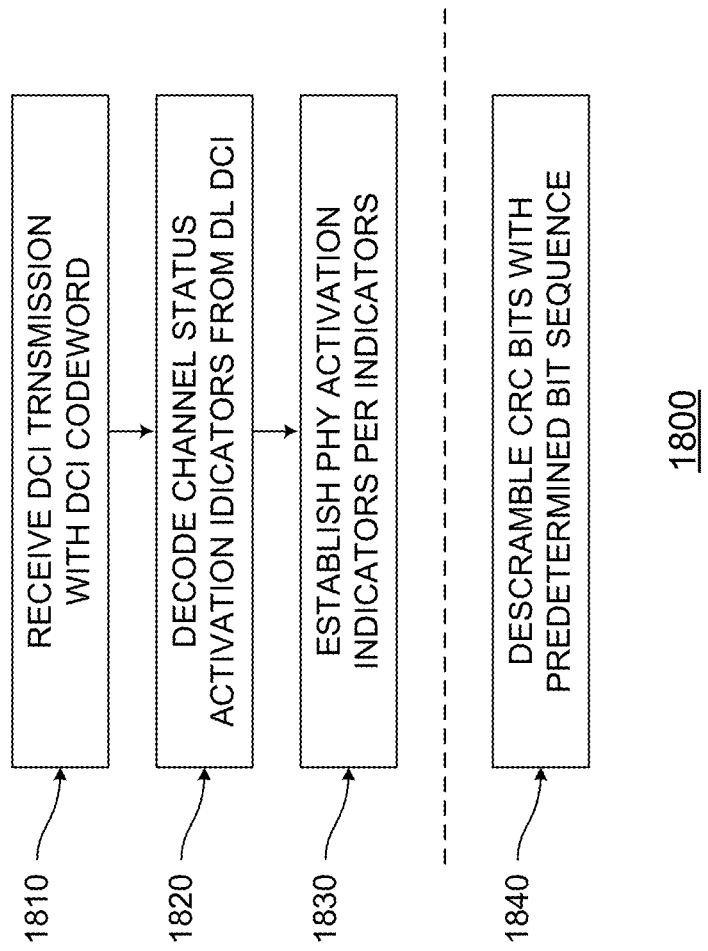
FIG. 18 illustrates methods for a UE to support physical-layer-based CC or channel activation in LSA systems, in accordance with some embodiments.

FIG. 18 illustrates methods for a UE to support physical-layer-based CC or channel activation in LSA systems, in accordance with some embodiments. Method 1800 may comprise a receiving 1810, a decoding 1820, and an establishing 1830. In receiving 1810, a UE (or other mobile handset) may receive a DCI transmission including an LSA-RNTI codeword from an eNB (or other base station). In decoding 1820, a plurality of channel/CC status activation indicators may be decoded from the LSA-RNTI codeword. In establishing 1830, a plurality of physical layer activation indicators may be established based on the plurality of channel/CC status activation indicators.

In some embodiments, the DCI transmission may be a PDCCH transmission. In some embodiments, a format of DCI transmission may be Format 1C. In some embodiments, the DCI transmission may have CRC scrambled with an RNTI, such as the LSA-RNTI discussed above.

In some embodiments, method 1800 may comprise a descrambling 1840. In descrambling 1840, a plurality of CRC bits of the DCI transmission may be descrambled with a predetermined bit sequence. In such embodiments, the predetermined bit sequence may be an RNTI, such as the LSA-RNTI discussed above.

In some embodiments, the third circuitry may be operable to establish a physical layer activation indicator based upon one of the channel/CC status activation indicators. In such embodiments, the physical layer activation indicator may be asserted when the status activation indicator has a value of "1". Similarly, in such embodiments, the physical layer activation indicator may be de-asserted when the status activation indicator has a value of "0". (In some embodiments, the interpretations given to values of "one" and "zero" may be reversed.)

Figure 19A:
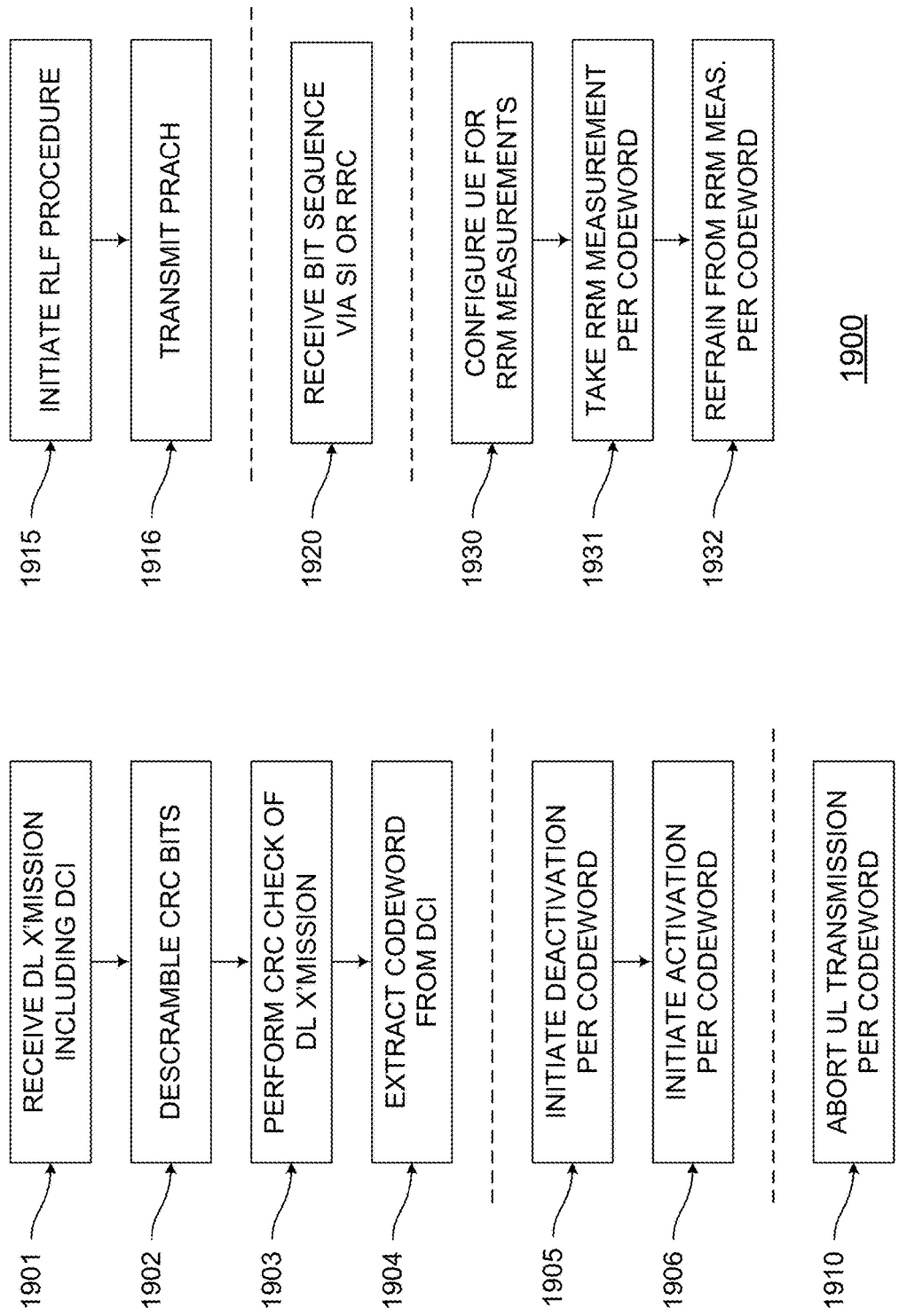
FIGS. 19A-19B illustrate methods for a UE to support physical-layer-based CC or channel activation in LSA systems, in accordance with some embodiments.
Figure 19B:
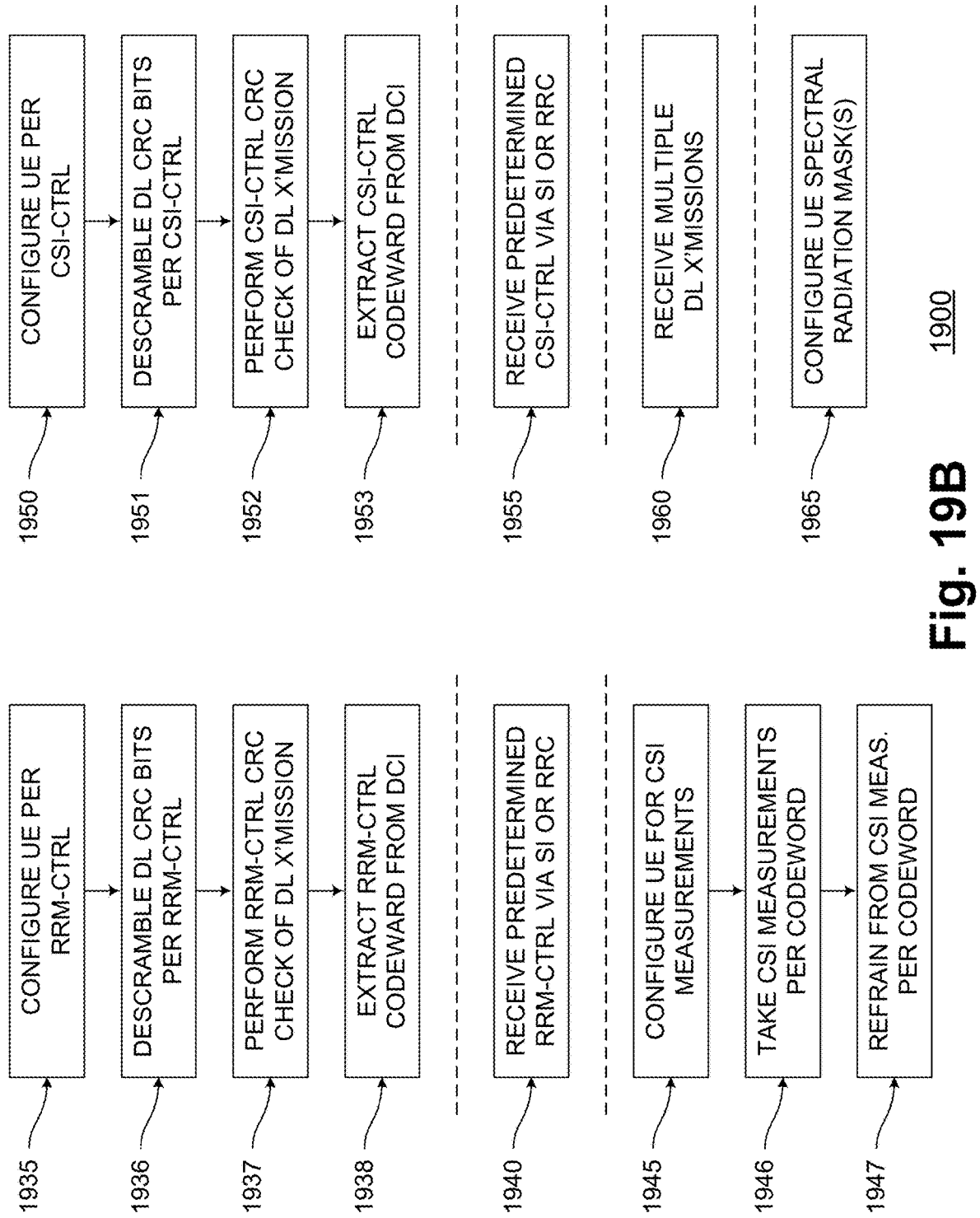

FIGS. 19A-19B illustrate methods for a UE to support physical-layer-based CC or channel activation in LSA systems, in accordance with some embodiments. With reference to FIG. 19A, method 1900 may include a receiving 1901, a descrambling 1902, a performing 1903, and an extracting 1904. In receiving 1901, a UE may receive a DL transmission including DCI. In descrambling 1902, a plurality of CRC bits of the DL transmission may be descrambled with respect to a predetermined bit sequence to generate a plurality of descrambled CRC bits. In performing 1903, a CRC check of the DL transmission against the plurality of descrambled CRC bits may be performed. In extracting 1904, a codeword may be extracted from the DCI if the CRC check passes. The codeword may have a plurality of bits corresponding to a plurality of channels/CCs, for which values of "one" may indicate that the corresponding channels/CCs should be activated, and values of "zero" may indicate that the corresponding channels/CCs should be deactivated. (In some embodiments, the interpretations given to values of "one" and "zero" may be reversed.)

Method 1900 may also include an initiating 1905 and an initiating 1906. In initiating 1905, a deactivation procedure for a currently-activated CC may be initiated when the corresponding bit of the codeword indicates that the CC should be deactivated. In initiating 1906, an activation procedure for a currently-deactivated CC may be initiated when the corresponding bit of the codeword indicates that the CC should be activated. In such embodiments, the DL transmission may be received on a PDCCH, and the plurality of bits of the codeword may correspond to CCs in increasing order of a configured index of the CCs.

In some embodiments, method 1900 may include an aborting 1910. In aborting 1910, a UL transmission for a currently-activated CC may be aborted when the corresponding bit of the codeword indicates that the CC should be deactivated.

Some embodiments of method 1900 may comprise an initiating 1915 and a transmitting 1916. In initiating 1915, an RLF procedure may be initiated for a currently-activated CC when the corresponding bit of the codeword indicates that the CC should be deactivated, and when the CC is configured as a PCell for the UE. In transmitting 1916, a PRACH transmission may be transmitted to a recipient that is one of a cell operating on a spectrum with a traditional licensing scheme, or a CC indicated in the codeword as being activated. In such embodiments, the UE may be configured with one or more cells to which a PRACH transmission may be transmitted when an RLF procedure is initiated.

Method 1900 may, in some embodiments, comprise a receiving 1920. In some embodiments of receiving 1920, the predetermined bit sequence may be received via a System Information transmission. In other embodiments of receiving 1920, the predetermined bit sequence may be received via an RRC configuration transmission.

In various embodiments, method 1900 may additionally comprise a configuring 1930, a taking 1931, and a refraining 1932. In configuring 1930, a UE may be configured for RRM measurements on one or more CCs. In taking 1931, RRM measurements may be taken for a CC upon the corresponding bit of the codeword indicating that the CC should be activated (such as by being set to "one"). In refraining 1932, RRM measurements may remain untaken for a CC upon the corresponding bit of the codeword indicating that the CC should be deactivated (such as by being set to "zero").

With reference to FIG. 19B, some embodiments of method 1900 may comprise a configuring 1935, a descrambling 1936, a performing 1937, and an extracting 1938. In configuring 1935, a UE may be configured with a predetermined RRM-control bit sequence for descrambling the plurality of CRC bits of the DL transmission. In descrambling 1936, the plurality of CRC bits of the DL transmission may be descrambled with respect to the predetermined RRM-control bit sequence in order to generate a plurality of descrambled RRM-control CRC bits. In performing 1937, an RRM-control CRC check of the DL transmission may be performed against the plurality of descrambled RRM-control CRC bits. In extracting 1938, an RRM-control codeword may be extracted from the DCI if the RRM-control CRC check passes. In such embodiments, the RRM-control codeword may have a plurality of bits corresponding to the plurality of CCs. In addition, values of "one" may indicate that RRM measurements for the corresponding CCs should be taken, while values of "zero" may indicate that RRM measurements for the corresponding CCs should remain untaken. (In some embodiments, the interpretations given to values of "one" and "zero" may be reversed.)

Method 1900 may, in some embodiments, comprise a receiving 1940. In some embodiments of receiving 1940, the predetermined RRM-control bit sequence may be received via an SI transmission. In other embodiments of receiving 1940, the predetermined RRM-control bit sequence may be received via an RRC configuration transmission.

In various embodiments, method 1900 may additionally comprise a configuring 1945, a taking 1946, and a refraining 1947. In configuring 1945, the UE may be configured for CSI measurements on one or more CCs. In taking 1946, CSI measurements may be taken for a CC upon the corresponding bit of the codeword indicating that the CC should be activated (such as by being set to "one"). In refraining 1947, CSI measurements may remain untaken for a CC upon the corresponding bit of the codeword indicating that the CC should be deactivated (such as by being set to "zero").

Some embodiments of method 1900 may comprise a configuring 1950, a descrambling 1951, a performing 1952, and an extracting 1953. In configuring 1950, a UE may be configured with a predetermined CSI-control bit sequence for descrambling the plurality of CRC bits of the DL transmission. In descrambling 1951, the plurality of CRC bits of the DL transmission may be descrambled with respect to the predetermined CSI-control bit sequence in order to generate a plurality of descrambled CSI-control CRC bits. In performing 1952, a CSI-control CRC check of the DL transmission may be performed against the plurality of descrambled CSI-control CRC bits. In extracting 1953, a CSI-control codeword may be extracted from the DCI if the CSI-control CRC check passes. In such embodiments, the CSI-control codeword may have a plurality of bits corresponding to the plurality of CCs. In addition, values of "one" may indicate that CSI measurements for the corresponding CCs should be taken, while values of "zero" may indicate that CSI measurements for the corresponding CCs should be remain untaken. (In some embodiments, the interpretations given to values of "one" and "zero" may be reversed.)

Method 1900 may, in some embodiments, comprise a receiving 1955. In some embodiments of receiving 1955, the predetermined CSI-control bit sequence may be received via an SI transmission. In other embodiments of receiving 1955, the predetermined CSI-control bit sequence may be received via an RRC configuration transmission.

In some embodiments, method 1900 may comprise a receiving 1960. One of an activation of a channel/CC and a deactivation of a channel/CC may be preceded by a modification period based upon an SFN. In receiving 1960, the DL transmission including DCI may be received a plurality of times during the modification period.

Various embodiments of method 1900 may include a configuring 1965. In some embodiments of configuring 1965, a radio front end of the UE may be configured with one or more individual spectral radiation masks. In other embodiments of configuring 1965, a radio front end of the UE may be configured with a spectral radiation mask for one or more channels/CCs.

Finally, in various embodiments, the predetermined bit sequence may be an RNTI. Similarly, the predetermined RRM-control bit sequence may be an RNTI, and the predetermined CSI-control bit sequence may be an RNTI.

Figure 20:
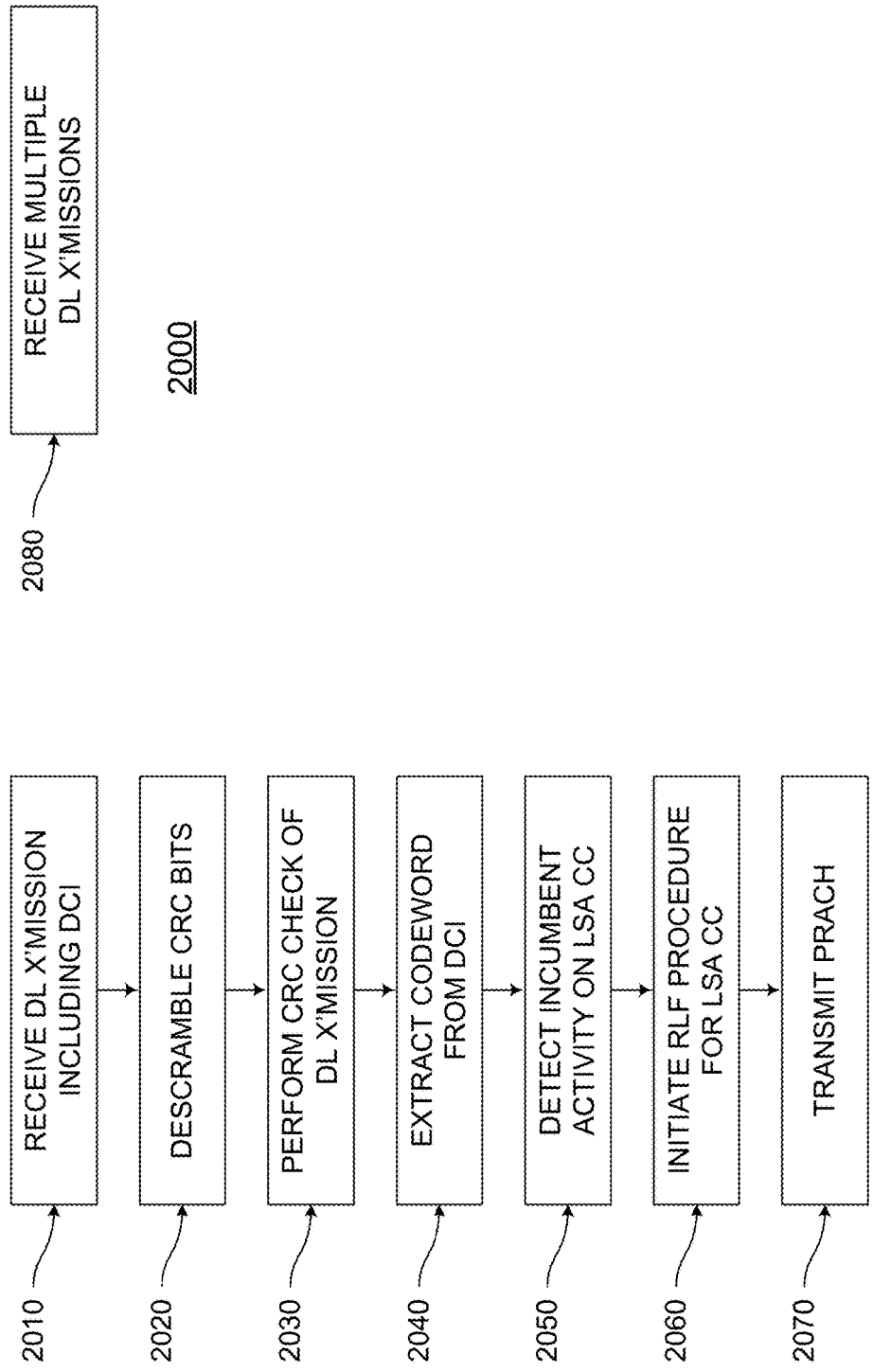
FIG. 20 illustrates methods for a UE to support physical-layer-based CC or channel activation in LSA systems, in accordance with some embodiments.

FIG. 20 illustrates methods for a UE to support physical-layer-based CC or channel activation in LSA systems, in accordance with some embodiments. Method 2000 may comprise a receiving 2010, a descrambling 2020, a performing 2030, an extracting 2040, a detecting 2050, an initiating 2060, and a transmitting 2070.

In receiving 2010, a UE may receive a DL transmission including DCI. In descrambling 2020, a plurality of CRC bits of the DL transmission may be descrambled with respect to a predetermined bit sequence to generate a plurality of descrambled CRC bits. In performing 2030, a CRC check of the DL transmission may be performed against the plurality of descrambled CRC bits. In extracting 2040, a codeword may be extracted from the DCI if the CRC check passes. The codeword may have a plurality of bits corresponding to a plurality of CCs or channels. Values of "one" may indicate that the corresponding channels/CCs should be activated, while values of "zero" may indicate that the corresponding channels/CCs should be deactivated. (In some embodiments, the interpretations given to values of "one" and "zero" may be reversed.)

In detecting 2050, incumbent activity on an LSA channel/CC may be detected. In initiating 2060, an RLF procedure may be initiated for the LSA CC. In transmitting 2070, a PRACH transmission may be transmitted to a recipient that is either a cell operated on spectrum with a traditional licensing scheme, or a CC indicated in the codeword as being activated.

In some embodiments of method 2000, the UE may be configured with one or more cells to which a PRACH transmission may be transmitted when an RLF procedure is initiated. In further embodiments of method 2000, one of an activation of a channel/CC and a deactivation of a channel/CC is preceded by a modification period based upon an SFN. Method 2000 may also comprise a receiving 2080, in which the DL transmission may be received a plurality of times during the modification period. Finally, in method 2000, the predetermined bit sequence may be an RNTI.

Figure 21:
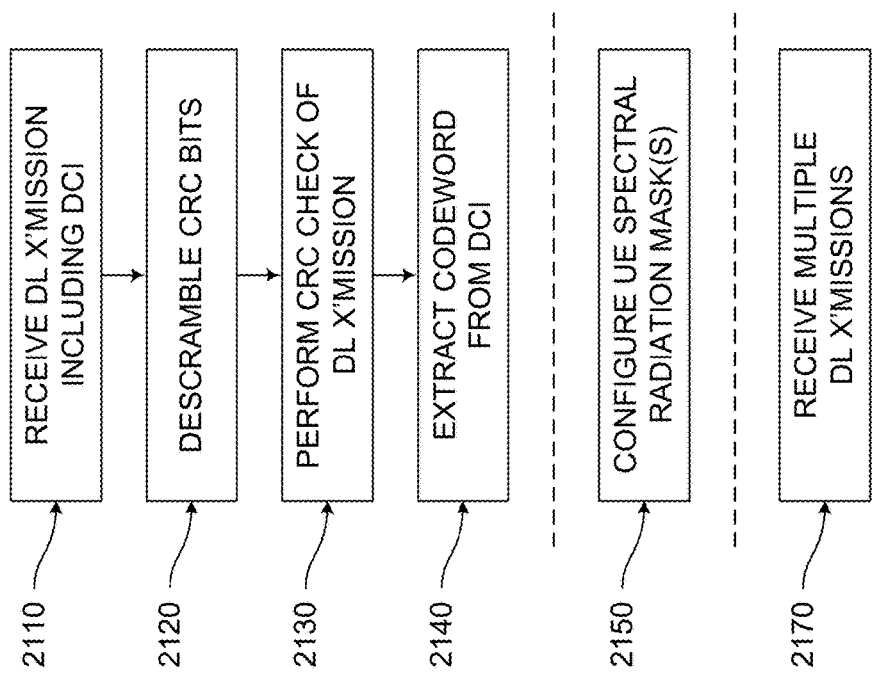
FIG. 21 illustrates methods for a UE to support physical-layer-based CC or channel activation in LSA systems, in accordance with some embodiments.

FIG. 21 illustrates methods for a UE to support physical-layer-based CC or channel activation in LSA systems, in accordance with some embodiments. Method 2100 may comprise a receiving 2110, a descrambling 2120, a performing 2130, and an extracting 2140. In receiving 2110, a UE may receive a DL transmission including DCI. In descrambling 2120, a plurality of CRC bits of the DL transmission may be descrambled with respect to a predetermined bit sequence to generate a plurality of descrambled CRC bits. In performing 2130, a CRC check of the DL transmission against the plurality of descrambled CRC bits may be performed. In extracting 2140, a codeword may be extracted from the DCI if the CRC check passes. The codeword may have a plurality of bits corresponding to a plurality of channels or CCs of predefined bandwidth. Values of "one" may indicate that the corresponding channels/CCs should be activated, while values of "zero" may indicate that the corresponding channels/CCs should be deactivated. (In some embodiments, the interpretations given to values of "one" and "zero" may be reversed.)

Various embodiments of method 2100 may include a configuring 2150. In some embodiments of configuring 2150, a radio front end of the UE may be configured with one or more individual spectral radiation masks. In other embodiments of configuring 2150, a radio front end of the UE may be configured with a spectral radiation mask for one or more channels/CCs.

In some embodiments of method 2100, an activation of a channel/CC and/or a deactivation of a channel/CC may be preceded by a modification period based upon an SFN. In a receiving 2170, the DL transmission may be received a plurality of times during the modification period. Finally, in various embodiments of method 2100, the predetermined bit sequence may be an RNTI.

Although the actions in the flowchart with reference to FIGS. 17-21 are shown in a particular order, the order of the actions can be modified. Thus, the illustrated embodiments can be performed in a different order, and some actions may be performed in parallel. Some of the actions and/or operations listed in FIGS. 17-21 are optional in accordance with certain embodiments. The numbering of the actions presented is for the sake of clarity and is not intended to prescribe an order of operations in which the various actions must occur. Additionally, operations from the various flows may be utilized in a variety of combinations.

Moreover, in some embodiments, machine readable storage media may have executable instructions that, when executed, cause an eNB (such as eNB 1410) to perform an operation comprising method 1700. Similarly, in some embodiments, machine readable storage media may have executable instructions that, when executed, cause a UE (such as UE 1430) to perform an operation comprising one or more of method 1800, method 1900, method 2000, and method 2100. Such machine readable storage media may include any of a variety of storage media, like magnetic storage media (e.g., magnetic tapes or magnetic disks), optical storage media (e.g., optical discs), electronic storage media (e.g., conventional hard disk drives, solid-state disk drives, or flash-memory-based storage media), or any other tangible storage media or non-transitory storage media.

Figure 22:
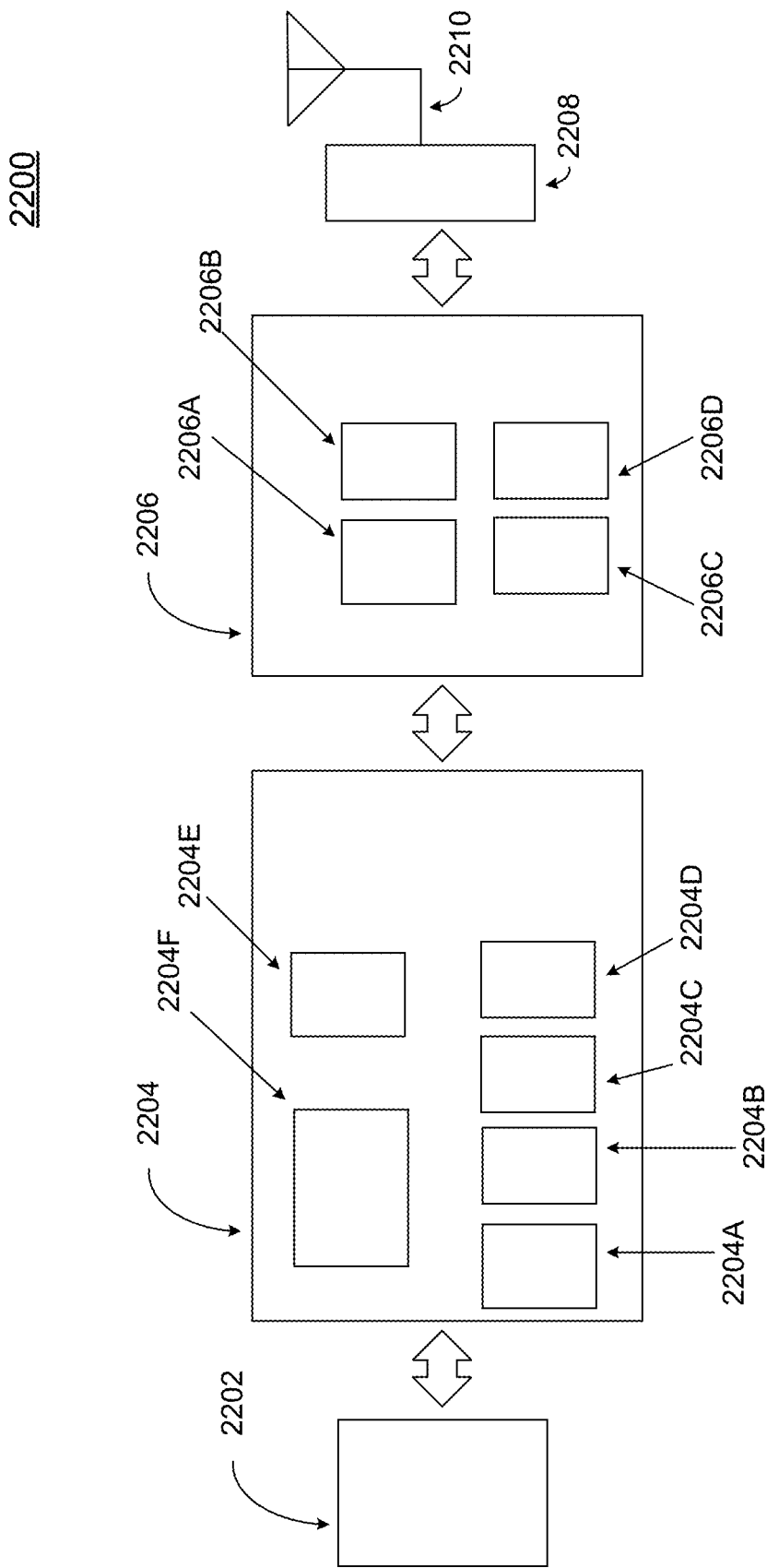
FIG. 22 illustrates example components of a UE device, in accordance with some embodiments.

FIG. 22 illustrates example components of a UE device 2200, in accordance with some embodiments. In some embodiments, the UE device 2200 may include application circuitry 2202, baseband circuitry 2204, Radio Frequency (RF) circuitry 2206, front-end module (FEM) circuitry 2208, a low-power wake-up receiver (LP-WUR), and one or more antennas 2210, coupled together at least as shown. In some embodiments, the UE device 2200 may include additional elements such as, for example, memory/storage, display, camera, sensor, and/or input/output (I/O) interface.

The application circuitry 2202 may include one or more application processors. For example, the application circuitry 2202 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 2204 may include circuitry such as, but not limited to, one or more single-core or multi-core processors. The baseband circuitry 2204 may include one or more baseband processors and/or control logic to process baseband signals received from a receive signal path of the RF circuitry 2206 and to generate baseband signals for a transmit signal path of the RF circuitry 2206. Baseband processing circuitry 2204 may interface with the application circuitry 2202 for generation and processing of the baseband signals and for controlling operations of the RF circuitry 2206. For example, in some embodiments, the baseband circuitry 2204 may include a second generation (2G) baseband processor 2204a, third generation (3G) baseband processor 2204b, fourth generation (4G) baseband processor 2204c, and/or other baseband processor(s) 2204d for other existing generations, generations in development or to be developed in the future (e.g., fifth generation (5G), 6G, etc.). The baseband circuitry 2204 (e.g., one or more of baseband processors 2204a-d) may handle various radio control functions that enable communication with one or more radio networks via the RF circuitry 2206. The radio control functions may include, but are not limited to, signal modulation/demodulation, encoding/decoding, radio frequency shifting, etc. In some embodiments, modulation/demodulation circuitry of the baseband circuitry 2204 may include Fast-Fourier Transform (FFT), precoding, and/or constellation mapping/demapping functionality. In some embodiments, encoding/decoding circuitry of the baseband circuitry 2204 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 2204 may include elements of a protocol stack such as, for example, elements of an EUTRAN protocol including, for example, physical (PHY), media access control (MAC), radio link control (RLC), packet data convergence protocol (PDCP), and/or RRC elements. A central processing unit (CPU) 2204e of the baseband circuitry 2204 may be configured to run elements of the protocol stack for signaling of the PHY, MAC, RLC, PDCP and/or RRC layers. In some embodiments, the baseband circuitry may include one or more audio digital signal processor(s) (DSP) 2204f. The audio DSP(s) 2204f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 2204 and the application circuitry 2202 may be implemented together such as, for example, on a system on a chip (SOC).

In some embodiments, the baseband circuitry 2204 may provide for communication compatible with one or more radio technologies. For example, in some embodiments, the baseband circuitry 2204 may support communication with an evolved universal terrestrial radio access network (EU-TRAN) and/or other wireless metropolitan area networks (WMAN), a wireless local area network (WLAN), a wireless personal area network (WPAN). Embodiments in which the baseband circuitry 2204 is configured to support radio communications of more than one wireless protocol may be referred to as multi-mode baseband circuitry.

RF circuitry 2206 may enable communication with wireless networks using modulated electromagnetic radiation through a non-solid medium. In various embodiments, the RF circuitry 2206 may include switches, filters, amplifiers, etc. to facilitate the communication with the wireless network. RF circuitry 2206 may include a receive signal path which may include circuitry to down-convert RF signals received from the FEM circuitry 2208 and provide baseband signals to the baseband circuitry 2204. RF circuitry 2206 may also include a transmit signal path which may include circuitry to up-convert baseband signals provided by the baseband circuitry 2204 and provide RF output signals to the FEM circuitry 2208 for transmission.

In some embodiments, the RF circuitry 2206 may include a receive signal path and a transmit signal path. The receive signal path of the RF circuitry 2206 may include mixer circuitry 2206a, amplifier circuitry 2206b and filter circuitry 2206c. The transmit signal path of the RF circuitry 2206 may include filter circuitry 2206c and mixer circuitry 2206a. RF circuitry 2206 may also include synthesizer circuitry 2206d for synthesizing a frequency for use by the mixer circuitry 2206a of the receive signal path and the transmit signal path. In some embodiments, the mixer circuitry 2206a of the receive signal path may be configured to down-convert RF signals received from the FEM circuitry 2208 based on the synthesized frequency provided by synthesizer circuitry 2206d. The amplifier circuitry 2206b may be configured to amplify the down-converted signals and the filter circuitry 2206c may be a low-pass filter (LPF) or band-pass filter (BPF) configured to remove unwanted signals from the down-converted signals to generate output baseband signals. Output baseband signals may be provided to the baseband circuitry 2204 for further processing. In some embodiments, the output baseband signals may be zero-frequency baseband signals, although this is not a requirement. In some embodiments, mixer circuitry 2206a of the receive signal path may comprise passive mixers, although the scope of the embodiments is not limited in this respect.

In some embodiments, the mixer circuitry 2206a of the transmit signal path may be configured to up-convert input baseband signals based on the synthesized frequency provided by the synthesizer circuitry 2206d to generate RF output signals for the FEM circuitry 2208. The baseband signals may be provided by the baseband circuitry 2204 and may be filtered by filter circuitry 2206c. The filter circuitry 2206c may include a low-pass filter (LPF), although the scope of the embodiments is not limited in this respect.

In some embodiments, the mixer circuitry 2206a of the receive signal path and the mixer circuitry 2206a of the transmit signal path may include two or more mixers and may be arranged for quadrature down-conversion and/or up-conversion respectively. In some embodiments, the mixer circuitry 2206a of the receive signal path and the mixer circuitry 2206a of the transmit signal path may include two or more mixers and may be arranged for image rejection (e.g., Hartley image rejection). In some embodiments, the mixer circuitry 2206a of the receive signal path and the mixer circuitry 2206a may be arranged for direct down-conversion and/or direct up-conversion, respectively. In some embodiments, the mixer circuitry 2206a of the receive signal path and the mixer circuitry 2206a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 2206 may include analog-to-digital converter (ADC) and digital-to-analog converter (DAC) circuitry and the baseband circuitry 2204 may include a digital baseband interface to communicate with the RF circuitry 2206.

In some dual-mode embodiments, a separate radio IC circuitry may be provided for processing signals for each spectrum, although the scope of the embodiments is not limited in this respect.

In some embodiments, the synthesizer circuitry 2206d may be a fractional-N synthesizer or a fractional N/N+1 synthesizer, although the scope of the embodiments is not limited in this respect as other types of frequency synthesizers may be suitable. For example, synthesizer circuitry 2206d may be a delta-sigma synthesizer, a frequency multiplier, or a synthesizer comprising a phase-locked loop with a frequency divider.

The synthesizer circuitry 2206d may be configured to synthesize an output frequency for use by the mixer circuitry 2206a of the RF circuitry 2206 based on a frequency input and a divider control input. In some embodiments, the synthesizer circuitry 2206d may be a fractional N/N+1 synthesizer.

In some embodiments, frequency input may be provided by a voltage controlled oscillator (VCO), although that is not a requirement. Divider control input may be provided by either the baseband circuitry 2204 or the applications processor 2202 depending on the desired output frequency. In some embodiments, a divider control input (e.g., N) may be determined from a look-up table based on a channel indicated by the applications processor 2202.

Synthesizer circuitry 2206d of the RF circuitry 2206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 2206d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 2206 may include an IQ/polar converter.

FEM circuitry 2208 may include a receive signal path which may include circuitry configured to operate on RF signals received from one or more antennas 2210, amplify the received signals and provide the amplified versions of the received signals to the RF circuitry 2206 for further processing. FEM circuitry 2208 may also include a transmit signal path which may include circuitry configured to amplify signals for transmission provided by the RF circuitry 2206 for transmission by one or more of the one or more antennas 2210.

In some embodiments, the FEM circuitry 2208 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 2206). The transmit signal path of the FEM circuitry 2208 may include a power amplifier (PA) to amplify input RF signals (e.g., provided by RF circuitry 2206), and one or more filters to generate RF signals for subsequent transmission (e.g., by one or more of the one or more antennas 2210.

In some embodiments, the UE 2200 comprises a plurality of power saving mechanisms. If the UE 2200 is in an RRC_Connected state, where it is still connected to the eNB as it expects to receive traffic shortly, then it may enter a state known as Discontinuous Reception Mode (DRX) after a period of inactivity. During this state, the device may power down for brief intervals of time and thus save power.

If there is no data traffic activity for an extended period of time, then the UE 2200 may transition off to an RRC_Idle state, where it disconnects from the network and does not perform operations such as channel quality feedback, handover, etc. The UE 2200 goes into a very low power state and it performs paging where again it periodically wakes up to listen to the network and then powers down again. The device cannot receive data in this state, in order to receive data, it should transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

Example 1 provides machine readable storage media having machine executable instructions that, when executed, cause one or more processors to perform an operation comprising: process, for a User Equipment (UE), a Downlink (DL) transmission including Downlink Control Information (DCI); descramble a plurality of Cyclic Redundancy Check (CRC) bits of the DL transmission with respect to a predetermined bit sequence to generate a plurality of descrambled CRC bits; perform a CRC check of the DL transmission against the plurality of descrambled CRC bits; and extract a codeword from the DCI if the if the CRC check passes, the codeword having a plurality of bits corresponding to plurality of Component Carriers (CCs), wherein one of values of '1' and '0' is to indicate that the corresponding CCs should be activated, and wherein one of values of '1' and '0' is to indicate that the corresponding CCs should be deactivated.

In example 2, the machine readable storage media of example 1, the operation comprising: initiate a deactivation procedure for a currently-activated CC when the corresponding bit of the codeword indicates the CC should be deactivated; and initiate an activation procedure for a currently-deactivated CC when the corresponding bit of the codeword indicates the CC should be activated, wherein the DL transmission is received on a Physical Downlink Control Channel (PDCCH); and wherein the plurality of bits of the codeword correspond to CCs in increasing order of a configured index of the CCs.

In example 3, the machine readable storage media of either of examples 1 or 2, the operation comprising: abort an Uplink (UL) transmission for a currently-activated CC when the corresponding bit of the codeword indicates that the CC should be deactivated.

In example 4, the machine readable storage media of any of examples 1 through 3, the operation comprising: initiate a Radio Link Failure (RLF) procedure for a currently-activated CC when the corresponding bit of the codeword indicates the CC should be deactivated, and when the CC is configured as a Primary Cell (PCell) for the UE; and generate a Physical Random Access Channel (PRACH) transmission to a recipient that is one of: a cell operated on spectrum with a traditional licensing scheme, or a CC indicated in the codeword as being activated.

In example 5, the machine readable storage media of example 4, wherein the UE is configured with one or more cells to which a PRACH transmission will be transmitted when a RLF procedure is initiated.

In example 6, the machine readable storage media of any of examples 1 through 5, the operation comprising: process the predetermined bit sequence via a System Information (SI) transmission.

In example 7, the machine readable storage media of any of examples 1 through 5, the operation comprising: process the predetermined bit sequence via a Radio Resource Control (RRC) configuration transmission.

In example 8, the machine readable storage media of any of examples 1 through 7, the operation comprising: configure the UE for Radio Resource Management (RRM) measurements on one or more CCs; take RRM measurements for a CC upon the corresponding bit of the codeword indicating the CC should be activated; and refrain from taking RRM measurements for a CC upon the corresponding bit of the codeword indicating the CC should be deactivated.

In example 9, the machine readable storage media of any of examples 1 through 8, the operation comprising: configure the UE with a predetermined RRM-control bit sequence for descrambling the plurality of CRC bits of the DL transmission; descramble the plurality of CRC bits of the DL transmission with respect to the predetermined RRM-control bit sequence to generate a plurality of descrambled RRM-control CRC bits; perform an RRM-control CRC check of the DL transmission against the plurality of descrambled RRM-control CRC bits; and extract an RRM-control codeword from the DCI if the RRM-control CRC check passes, the RRM-control codeword having a plurality of bits corresponding to the plurality of CCs, wherein one of values of '1' and '0' is to indicate that RRM measurements for the corresponding CCs should be activated, and wherein one of values of '1' and '0' is to indicate that RRM measurements for the corresponding CCs should be deactivated.

In example 10, the machine readable storage media of example 9, the operation comprising: process the predetermined RRM-control bit sequence via a System Information (SI) transmission.

In example 11, the machine readable storage media of example 9, the operation comprising: process the predetermined bit sequence via a Radio Resource Control (RRC) configuration transmission.

In example 12, the machine readable storage media of any of examples 1 through 11, the operation comprising: configure the UE for Channel State Information (CSI) measurements on one or more CCs; take CSI measurements for a CC upon the corresponding bit of the codeword indicating the CC should be activated; and refrain from taking CSI measurements for a CC upon the corresponding bit of the codeword indicating the CC should be deactivated.

In example 13, the machine readable storage media of any of examples 1 through 12, the operation comprising: configure the UE with a predetermined CSI-control bit sequence for descrambling the plurality of CRC bits of the DL transmission; descramble the plurality of CRC bits of the DL transmission with respect to the predetermined CSI-control bit sequence to generate a plurality of descrambled CSI-control CRC bits; perform a CSI-control CRC check of the DL transmission against the plurality of descrambled CSI-control CRC bits; and extract a CSI-control codeword from the DCI if the CSI-control CRC check passes, the CSI-control codeword having a plurality of bits corresponding to the plurality of CCs, wherein one of values of '1' and '0' is to indicate that CSI measurements for the corresponding CCs should be activated, and wherein one of values of '1' and '0' is to indicate that CSI measurements for the corresponding CCs should be deactivated.

In example 14, the machine readable storage media of example 13, the operation comprising: process the predetermined CSI-control bit sequence via a System Information (SI) transmission.

In example 15, the machine readable storage media of example 13, the operation comprising: process the predetermined CSI-control bit sequence via a Radio Resource Control (RRC) configuration transmission.

In example 16, the machine readable storage media of any of examples 1 through 14, wherein one of an activation of a CC and a deactivation of a CC is preceded by a modification period based upon a System Frame Number (SFN).

In example 17, the machine readable storage media of example 16, the operation comprising: process the DL transmission including DCI a plurality of times during the modification period.

In example 18, the machine readable storage media of example 1, the operation comprising: configure a radio front end of the UE with one or more individual spectral radiation masks.

In example 19, the machine readable storage media of either of examples 1 or 18, the operation comprising: configure a radio front end of the UE with a spectral radiation mask for one or more channels adjacent to an activated channel.

In example 20, the machine readable storage media of any of examples 1 through 19, wherein the predetermined bit sequence is a Radio Network Temporary Identifier (RNTI).

Example 21 provides a method comprising: processing, for a User Equipment (UE), a Downlink (DL) transmission including Downlink Control Information (DCI); descrambling a plurality of Cyclic Redundancy Check (CRC) bits of the DL transmission with respect to a predetermined bit sequence to generate a plurality of descrambled CRC bits; performing a CRC check of the DL transmission against the plurality of descrambled CRC bits; and extracting a codeword from the DCI if the if the CRC check passes, the codeword having a plurality of bits corresponding to plurality of Component Carriers (CCs), wherein one of values of '1' and '0' is to indicate that the corresponding CCs should be activated, and wherein one of values of '1' and '0' is to indicate that the corresponding CCs should be deactivated.

In example 22, the method of example 21, comprising: initiating a deactivation procedure for a currently-activated CC when the corresponding bit of the codeword indicates the CC should be deactivated; and initiating an activation procedure for a currently-deactivated CC when the corresponding bit of the codeword indicates the CC should be activated, wherein the DL transmission is received on a Physical Downlink Control Channel (PDCCH); and wherein the plurality of bits of the codeword correspond to CCs in increasing order of a configured index of the CCs.

In example 23, the method of either of examples 21 or 22, comprising: aborting an Uplink (UL) transmission for a currently-activated CC when the corresponding bit of the codeword indicates that the CC should be deactivated.

In example 24, the method of any of examples 21 through 23, comprising: initiating a Radio Link Failure (RLF) procedure for a currently-activated CC when the corresponding bit of the codeword indicates the CC should be deactivated, and when the CC is configured as a Primary Cell (PCell) for the UE; and generate a Physical Random Access Channel (PRACH) transmission to a recipient that is one of: a cell operated on spectrum with a traditional licensing scheme, or a CC indicated in the codeword as being activated.

In example 25, the method of example 24, wherein the UE is configured with one or more cells to which a PRACH transmission will be transmitted when a RLF procedure is initiated.

In example 26, the method of any of examples 21 through 25, comprising: processing the predetermined bit sequence via a System Information (SI) transmission.

In example 27, the method of any of examples 21 through 25, comprising: processing the predetermined bit sequence via a Radio Resource Control (RRC) configuration transmission.

In example 28, the method of any of examples 21 through 27, comprising: configuring the UE for Radio Resource Management (RRM) measurements on one or more CCs; taking RRM measurements for a CC upon the corresponding bit of the codeword indicating the CC should be activated; and refraining from taking RRM measurements for a CC upon the corresponding bit of the codeword indicating the CC should be deactivated.

In example 29, the method of any of examples 21 through 28, comprising: configuring the UE with a predetermined RRM-control bit sequence for descrambling the plurality of CRC bits of the DL transmission; descrambling the plurality of CRC bits of the DL transmission with respect to the predetermined RRM-control bit sequence to generate a plurality of descrambled RRM-control CRC bits; performing an RRM-control CRC check of the DL transmission against the plurality of descrambled RRM-control CRC bits; and extracting an RRM-control codeword from the DCI if the RRM-control CRC check passes, the RRM-control codeword having a plurality of bits corresponding to the plurality of CCs, wherein one of values of '1' and '0' is to indicate that RRM measurements for the corresponding CCs should be activated, and wherein one of values of '1' and '0' is to indicate that RRM measurements for the corresponding CCs should be deactivated.

In example 30, the method of example 29, comprising: processing the predetermined RRM-control bit sequence via a System Information (SI) transmission.

In example 31, the method of example 29, comprising: processing the predetermined bit sequence via a Radio Resource Control (RRC) configuration transmission.

In example 32, the method of any of examples 21 through 31, comprising: configuring the UE for Channel State Information (CSI) measurements on one or more CCs; taking CSI measurements for a CC upon the corresponding bit of the codeword indicating the CC should be activated; and refraining from taking CSI measurements for a CC upon the corresponding bit of the codeword indicating the CC should be deactivated.

In example 33, the method of any of examples 21 through 32, comprising: configuring the UE with a predetermined CSI-control bit sequence for descrambling the plurality of CRC bits of the DL transmission; descrambling the plurality of CRC bits of the DL transmission with respect to the predetermined CSI-control bit sequence to generate a plurality of descrambled CSI-control CRC bits; performing a CSI-control CRC check of the DL transmission against the plurality of descrambled CSI-control CRC bits; and extracting a CSI-control codeword from the DCI if the CSI-control CRC check passes, the CSI-control codeword having a plurality of bits corresponding to the plurality of CCs, wherein one of values of '1' and '0' is to indicate that CSI measurements for the corresponding CCs should be activated, and wherein one of values of '1' and '0' is to indicate that CSI measurements for the corresponding CCs should be deactivated.

In example 34, the method of example 33, comprising: processing the predetermined CSI-control bit sequence via a System Information (SI) transmission.

In example 35, the method of example 33, comprising: processing the predetermined CSI-control bit sequence via a Radio Resource Control (RRC) configuration transmission.

In example 36, the method of any of examples 21 through 34, wherein one of an activation of a CC and a deactivation of a CC is preceded by a modification period based upon a System Frame Number (SFN).

In example 37, the method of example 36, comprising: processing the DL transmission including DCI a plurality of times during the modification period.

In example 38, the method of example 21, comprising: configuring a radio front end of the UE with one or more individual spectral radiation masks.

In example 39, the method of either of examples 21 or 38, comprising: configuring a radio front end of the UE with a spectral radiation mask for one or more channels adjacent to an activated channel.

In example 40, the method of any of examples 21 through 39, wherein the predetermined bit sequence is a Radio Network Temporary Identifier (RNTI).

Example 41 provides machine readable storage media having machine executable instructions stored thereon that, when executed, cause one or more processors to perform a method according to any one of examples 21 through 40.

Example 42 provides an apparatus of a User Equipment (UE), the UE being operable to communicate with a base station on a wireless network, comprising: means for processing, for a User Equipment (UE), a Downlink (DL) transmission including Downlink Control Information (DCI); means for descrambling a plurality of Cyclic Redundancy Check (CRC) bits of the DL transmission with respect to a predetermined bit sequence to generate a plurality of descrambled CRC bits; means for performing a CRC check of the DL transmission against the plurality of descrambled CRC bits; and means for extracting a codeword from the DCI if the if the CRC check passes, the codeword having a plurality of bits corresponding to plurality of Component Carriers (CCs), wherein one of values of '1' and '0' is to indicate that the corresponding CCs should be activated, and wherein one of values of '1' and '0' is to indicate that the corresponding CCs should be deactivated.

In example 43, the apparatus of example 42, comprising: means for initiating a deactivation procedure for a currently-activated CC when the corresponding bit of the codeword indicates the CC should be deactivated; and means for initiating an activation procedure for a currently-deactivated CC when the corresponding bit of the codeword indicates the CC should be activated, wherein the DL transmission is received on a Physical Downlink Control Channel (PD-CCH); and wherein the plurality of bits of the codeword correspond to CCs in increasing order of a configured index of the CCs.

In example 44, the apparatus of either of examples 42 or 43, comprising: means for aborting an Uplink (UL) transmission for a currently-activated CC when the corresponding bit of the codeword indicates that the CC should be deactivated.

In example 45, the apparatus of any of examples 42 through 44, comprising: means for initiating a Radio Link Failure (RLF) procedure for a currently-activated CC when the corresponding bit of the codeword indicates the CC should be deactivated, and when the CC is configured as a Primary Cell (PCell) for the UE; and means for generate a Physical Random Access Channel (PRACH) transmission to a recipient that is one of: a cell operated on spectrum with a traditional licensing scheme, or a CC indicated in the codeword as being activated.

In example 46, the apparatus of example 45, wherein the UE is configured with one or more cells to which a PRACH transmission will be transmitted when a RLF procedure is initiated.

In example 47, the apparatus of any of examples 42 through 46, comprising: means for processing the predetermined bit sequence via a System Information (SI) transmission.

In example 48, the apparatus of any of examples 42 through 46, comprising: means for processing the predetermined bit sequence via a Radio Resource Control (RRC) configuration transmission.

In example 49, the apparatus of any of examples 42 through 48, comprising: means for configuring the UE for Radio Resource Management (RRM) measurements on one or more CCs; means for taking RRM measurements for a CC upon the corresponding bit of the codeword indicating the CC should be activated; and means for refraining from taking RRM measurements for a CC upon the corresponding bit of the codeword indicating the CC should be deactivated.

In example 50, the apparatus of any of examples 42 through 49, comprising: means for configuring the UE with a predetermined RRM-control bit sequence for descrambling the plurality of CRC bits of the DL transmission; means for descrambling the plurality of CRC bits of the DL transmission with respect to the predetermined RRM-control bit sequence to generate a plurality of descrambled RRM-control CRC bits; means for performing an RRM-control CRC check of the DL transmission against the plurality of descrambled RRM-control CRC bits; and means for extracting an RRM-control codeword from the DCI if the RRM-control CRC check passes, the RRM-control codeword having a plurality of bits corresponding to the plurality of CCs, wherein one of values of '1' and '0' is to indicate that RRM measurements for the corresponding CCs should be activated, and wherein one of values of '1' and '0' is to indicate that RRM measurements for the corresponding CCs should be deactivated.

In example 51, the apparatus of example 50, comprising: means for processing the predetermined RRM-control bit sequence via a System Information (SI) transmission.

In example 52, the apparatus of example 50, comprising: means for processing the predetermined bit sequence via a Radio Resource Control (RRC) configuration transmission.

In example 53, the apparatus of any of examples 42 through 52, comprising: means for configuring the UE for Channel State Information (CSI) measurements on one or more CCs; means for taking CSI measurements for a CC upon the corresponding bit of the codeword indicating the CC should be activated; and means for refraining from taking CSI measurements for a CC upon the corresponding bit of the codeword indicating the CC should be deactivated.

In example 54, the apparatus of any of examples 42 through 53, comprising: means for configuring the UE with a predetermined CSI-control bit sequence for descrambling the plurality of CRC bits of the DL transmission; means for descrambling the plurality of CRC bits of the DL transmission with respect to the predetermined CSI-control bit sequence to generate a plurality of descrambled CSI-control CRC bits; means for performing a CSI-control CRC check of the DL transmission against the plurality of descrambled CSI-control CRC bits; and means for extracting a CSI-control codeword from the DCI if the CSI-control CRC check passes, the CSI-control codeword having a plurality of bits corresponding to the plurality of CCs, wherein one of values of '1' and '0' is to indicate that CSI measurements for the corresponding CCs should be activated, and wherein one of values of '1' and '0' is to indicate that CSI measurements for the corresponding CCs should be deactivated.

In example 55, the apparatus of example 54, comprising: means for processing the predetermined CSI-control bit sequence via a System Information (SI) transmission.

In example 56, the apparatus of example 54, comprising: means for processing the predetermined CSI-control bit sequence via a Radio Resource Control (RRC) configuration transmission.

In example 57, the apparatus of any of examples 42 through 55, wherein one of an activation of a CC and a deactivation of a CC is preceded by a modification period based upon a System Frame Number (SFN).

In example 58, the apparatus of example 57, comprising: means for processing the DL transmission including DCI a plurality of times during the modification period.

In example 59, the apparatus of example 42, comprising: means for configuring a radio front end of the UE with one or more individual spectral radiation masks.

In example 60, the apparatus of either of examples 42 or 59, comprising: means for configuring a radio front end of the UE with a spectral radiation mask for one or more channels adjacent to an activated channel.

In example 61, the apparatus of any of examples 42 through 60, wherein the predetermined bit sequence is a Radio Network Temporary Identifier (RNTI).

Example 62 provides machine readable storage media having machine executable instructions that, when executed, cause one or more processors to perform an operation comprising: process, for a User Equipment (UE), a Downlink (DL) transmission including Downlink Control Information (DCI); descramble a plurality of Cyclic Redundancy Check (CRC) bits of the DL transmission with respect to a predetermined bit sequence to generate a plurality of descrambled CRC bits; perform a CRC check of the DL transmission against the plurality of descrambled CRC bits; extract a codeword from the DCI if the if the CRC check passes, the codeword having a plurality of bits corresponding to a plurality of Component Carriers (CCs), wherein one of values of '1' and '0' is to indicate that the corresponding CCs should be activated, and wherein one of values of '1' and '0' is to indicate that the corresponding CCs should be deactivated; detect incumbent activity on a Licensed Shared Access (LSA) Component Carrier (CC); initiate a Radio Link Failure (RLF) procedure for the LSA CC; and generate a Physical Random Access Channel (PRACH) transmission to a recipient that is one of: a cell operated on spectrum with a traditional licensing scheme, or a CC indicated in the codeword as being activated.

In example 63, the machine readable storage media of example 62, wherein the UE is configured with one or more cells to which a PRACH transmission will be transmitted when a RLF procedure is initiated.

In example 64, the machine readable storage media of either of examples 62 or 63, wherein one of an activation of a CC and a deactivation of a CC is preceded by a modification period based upon a System Frame Number (SFN).

In example 65, the machine readable storage media of any of examples 62 through 64, the operation comprising: process the DL transmission including DCI a plurality of times during the modification period.

In example 66, the machine readable storage media of any of examples 62 through 65, wherein the predetermined bit sequence is a Radio Network Temporary Identifier (RNTI).

Example 67 provides a method comprising: processing, for a User Equipment (UE), a Downlink (DL) transmission including Downlink Control Information (DCI); descrambling a plurality of Cyclic Redundancy Check (CRC) bits of the DL transmission with respect to a predetermined bit sequence to generate a plurality of descrambled CRC bits; performing a CRC check of the DL transmission against the plurality of descrambled CRC bits; extracting a codeword from the DCI if the if the CRC check passes, the codeword having a plurality of bits corresponding to a plurality of Component Carriers (CCs), wherein one of values of '1' and '0' is to indicate that the corresponding CCs should be activated, and wherein one of values of '1' and '0' is to indicate that the corresponding CCs should be deactivated; detecting incumbent activity on a Licensed Shared Access (LSA) Component Carrier (CC); initiating a Radio Link Failure (RLF) procedure for the LSA CC; and generating a Physical Random Access Channel (PRACH) transmission to a recipient that is one of: a cell operated on spectrum with a traditional licensing scheme, or a CC indicated in the codeword as being activated.

In example 68, the method of example 67, wherein the UE is configured with one or more cells to which a PRACH transmission will be transmitted when a RLF procedure is initiated.

In example 69, the method of either of examples 67 or 68, wherein one of an activation of a CC and a deactivation of a CC is preceded by a modification period based upon a System Frame Number (SFN).

In example 70, the method of any of examples 67 through 69, comprising: processing the DL transmission including DCI a plurality of times during the modification period.

In example 71, the method of any of examples 67 through 70, wherein the predetermined bit sequence is a Radio Network Temporary Identifier (RNTI).

Example 72 provides machine readable storage media having machine executable instructions stored thereon that, when executed, cause one or more processors to perform a method according to any one of examples 67 through 71.

Example 73 provides an apparatus of a User Equipment (UE), the UE being operable to communicate with a base station on a wireless network, comprising: means for processing a Downlink (DL) transmission including Downlink Control Information (DCI); means for descrambling a plurality of Cyclic Redundancy Check (CRC) bits of the DL transmission with respect to a predetermined bit sequence to generate a plurality of descrambled CRC bits; means for performing a CRC check of the DL transmission against the plurality of descrambled CRC bits; means for extracting a codeword from the DCI if the if the CRC check passes, the codeword having a plurality of bits corresponding to a plurality of Component Carriers (CCs), wherein one of values of '1' and '0' is to indicate that the corresponding CCs should be activated, and wherein one of values of '1' and '0' is to indicate that the corresponding CCs should be deactivated; means for detecting incumbent activity on a Licensed Shared Access (LSA) Component Carrier (CC); means for initiating a Radio Link Failure (RLF) procedure for the LSA CC; and means for generating a Physical Random Access Channel (PRACH) transmission to a recipient that is one of: a cell operated on spectrum with a traditional licensing scheme, or a CC indicated in the codeword as being activated.

In example 74, the apparatus of example 73, wherein the UE is configured with one or more cells to which a PRACH transmission will be transmitted when a RLF procedure is initiated.

In example 75, the apparatus of either of examples 73 or 74, wherein one of an activation of a CC and a deactivation of a CC is preceded by a modification period based upon a System Frame Number (SFN).

In example 76, the apparatus of any of examples 73 through 75, comprising: means for processing the DL transmission including DCI a plurality of times during the modification period.

In example 77, the apparatus of any of examples 73 through 76, wherein the predetermined bit sequence is a Radio Network Temporary Identifier (RNTI).

Example 78 provides machine readable storage media having machine executable instructions that, when executed, cause one or more processors to perform an operation comprising: process, for a User Equipment (UE), a Downlink (DL) transmission including Downlink Control Information (DCI); descramble a plurality of Cyclic Redundancy Check (CRC) bits of the DL transmission with respect to a predetermined bit sequence to generate a plurality of descrambled CRC bits; perform a CRC check of the DL transmission against the plurality of descrambled CRC bits; and extract a codeword from the DCI if the if the CRC check passes, the codeword having a plurality of bits corresponding to a plurality of channels of predefined bandwidths, wherein one of values of '1' and '0' is to indicate that the corresponding channels should be activated, and wherein one of values of '1' and '0' is to indicate that the corresponding channels should be deactivated.

In example 79, the machine readable storage media of example 78, the operation comprising: configure a radio front end of the UE with one or more individual spectral radiation masks.

In example 80, the machine readable storage media of example 78 through 79, the operation comprising: configure a radio front end of the UE with a spectral radiation mask for one or more channels adjacent to an activated channel.

In example 81, the machine readable storage media of any of examples 78 through 80, wherein one of an activation of a channel and a deactivation of a channel is preceded by a modification period based upon a System Frame Number (SFN).

In example 82, the machine readable storage media of any of examples 78 through 81, the operation comprising: process the DL transmission including DCI a plurality of times during the modification period.

In example 83, the machine readable storage media of any of examples 78 through 82, wherein the predetermined bit sequence is a Radio Network Temporary Identifier (RNTI).

Example 84 provides a method comprising: processing, for a User Equipment (UE), a Downlink (DL) transmission including Downlink Control Information (DCI); descrambling a plurality of Cyclic Redundancy Check (CRC) bits of the DL transmission with respect to a predetermined bit sequence to generate a plurality of descrambled CRC bits; performing a CRC check of the DL transmission against the plurality of descrambled CRC bits; and extracting a codeword from the DCI if the if the CRC check passes, the codeword having a plurality of bits corresponding to a plurality of channels of predefined bandwidths, wherein one of values of '1' and '0' is to indicate that the corresponding channels should be activated, and wherein one of values of '1' and '0' is to indicate that the corresponding channels should be deactivated.

In example 85, the method of example 84, comprising: configuring a radio front end of the UE with one or more individual spectral radiation masks.

In example 86, the method of example 84 through 85, comprising: configuring a radio front end of the UE with a spectral radiation mask for one or more channels adjacent to an activated channel.

In example 87, the method of any of examples 84 through 86, wherein one of an activation of a channel and a deactivation of a channel is preceded by a modification period based upon a System Frame Number (SFN).

In example 88, the method of any of examples 84 through 87, comprising: processing the DL transmission including DCI a plurality of times during the modification period.

In example 89, the method of any of examples 84 through 88, wherein the predetermined bit sequence is a Radio Network Temporary Identifier (RNTI).

Example 90 provides machine readable storage media having machine executable instructions stored thereon that, when executed, cause one or more processors to perform a method according to any one of examples 84 through 89.

Example 91 provides an apparatus of a User Equipment (UE), the UE being operable to communicate with a base station on a wireless network, comprising: means for processing a Downlink (DL) transmission including Downlink Control Information (DCI); means for descrambling a plurality of Cyclic Redundancy Check (CRC) bits of the DL transmission with respect to a predetermined bit sequence to generate a plurality of descrambled CRC bits; means for performing a CRC check of the DL transmission against the plurality of descrambled CRC bits; and means for extracting a codeword from the DCI if the if the CRC check passes, the codeword having a plurality of bits corresponding to a plurality of channels of predefined bandwidths, wherein one of values of '1' and '0' is to indicate that the corresponding channels should be activated, and wherein one of values of '1' and '0' is to indicate that the corresponding channels should be deactivated.

In example 92, the apparatus of example 91, comprising: means for configuring a radio front end of the UE with one or more individual spectral radiation masks.

In example 93, the apparatus of example 91 through 92, comprising: means for configuring a radio front end of the UE with a spectral radiation mask for one or more channels adjacent to an activated channel.

In example 94, the apparatus of any of examples 91 through 93, wherein one of an activation of a channel and a deactivation of a channel is preceded by a modification period based upon a System Frame Number (SFN).

In example 95, the apparatus of any of examples 91 through 94, comprising: means for processing the DL transmission including DCI a plurality of times during the modification period.

In example 96, the apparatus of any of examples 91 through 95, wherein the predetermined bit sequence is a Radio Network Temporary Identifier (RNTI).

Example 97 provides an apparatus of a base station, the base station being operable to communicate with a User Equipment (UE) on a wireless network, comprising: one or more processors to: generate a plurality of channel status activation indicators; encode the plurality of channel status activation indicators into a Downlink Control Information (DCI) codeword; and generate, for the UE, a DCI transmission carrying the DCI codeword.

In example 98, the apparatus of example 97, wherein the DCI transmission is a Physical Downlink Control Channel (PDCCH) transmission.

In example 99, the apparatus of either of examples 97 or 98, wherein the format of the DCI transmission is Format 1C.

In example 100, the apparatus of any of examples 97 through 99, wherein the one or more processors are further to: scramble a plurality of Cyclic Redundancy Check (CRC) bits of the DCI transmission with a predetermined bit sequence.

In example 101, the apparatus of example 100, wherein the predetermined bit sequence is to specify a channel activation-and-deactivation Radio Network Temporary Identifier (RNTI).

In example 102. A base station device comprising an application processor, a memory, one or more antenna ports, and an interface for allowing the application processor to communicate with another device, the base station device including the apparatus of any of examples 97 through 101.

Example 103 provides machine readable storage media having machine executable instructions that, when executed, cause one or more processors to perform an operation comprising: generate, for a base station, a plurality of channel status activation indicators; encode the plurality of channel status activation indicators into a Downlink Control Information (DCI) codeword; and generate, for the UE, a DCI transmission carrying the DCI codeword.

In example 104, the machine readable storage media of example 103, wherein the DCI transmission is a Physical Downlink Control Channel (PDCCH) transmission.

In example 105, the machine readable storage media of either of examples 103 or 104, wherein the format of the DCI transmission is Format 1C.

In example 106, the machine readable storage media of any of examples 103 through 105, the operation comprising: scramble a plurality of Cyclic Redundancy Check (CRC) bits of the DCI transmission with a predetermined bit sequence.

In example 107, the machine readable storage media of example 106, wherein the predetermined bit sequence is to specify a channel activation-and-deactivation Radio Network Temporary Identifier (RNTI).

Example 108 provides a method comprising: generating, for a base station, a plurality of channel status activation indicators; encoding the plurality of channel status activation indicators into a Downlink Control Information (DCI) codeword; and generating, for the UE, a DCI transmission carrying the DCI codeword.

In example 109, the method of example 108, wherein the DCI transmission is a Physical Downlink Control Channel (PDCCH) transmission.

In example 110, the method of either of examples 108 or 109, wherein the format of the DCI transmission is Format 1C.

In example 111, the method of any of examples 108 through 110, comprising: scrambling a plurality of Cyclic Redundancy Check (CRC) bits of the DCI transmission with a predetermined bit sequence.

In example 112, the method of example 111, wherein the predetermined bit sequence is to specify a channel activation-and-deactivation Radio Network Temporary Identifier (RNTI).

Example 113 provides machine readable storage media having machine executable instructions stored thereon that, when executed, cause one or more processors to perform a method according to any one of examples 108 through 112.

Example 114 provides an apparatus of a base station, the base station being operable to communicate with a User Equipment (UE) on a wireless network, comprising: means for generating a plurality of channel status activation indicators; means for encoding the plurality of channel status activation indicators into a Downlink Control Information (DCI) codeword; and means for generating, for the UE, a DCI transmission carrying the DCI codeword.

In example 115, the apparatus of example 114, wherein the DCI transmission is a Physical Downlink Control Channel (PDCCH) transmission.

In example 116, the apparatus of either of examples 114 or 115, wherein the format of the DCI transmission is Format 1C.

In example 117, the apparatus of any of examples 114 through 116, comprising: means for scrambling a plurality of Cyclic Redundancy Check (CRC) bits of the DCI transmission with a predetermined bit sequence.

In example 118, the apparatus of example 117, wherein the predetermined bit sequence is to specify a channel activation-and-deactivation Radio Network Temporary Identifier (RNTI).

Example 119 provides an apparatus of a User Equipment (UE), the UE being operable to communicate with a base station on a wireless network, comprising: one or more processors to: process a Downlink Control Information (DCI) transmission from the base station, the DCI transmission including a DCI codeword; decode a plurality of channel status activation indicators from the DCI codeword; and trigger a plurality of physical layer activation-and-deactivation circuitries based on the plurality of channel status activation indicators.

In example 120, the apparatus of example 119, wherein the DCI transmission is a Physical Downlink Control Channel (PDCCH) transmission.

In example 121, the apparatus of either of examples 119 or 120, wherein the format of the DCI transmission is Format 1C.

In example 122, the apparatus of any of examples 119 through 121, wherein the one or more processors are further to: descramble a plurality of Cyclic Redundancy Check (CRC) bits of the DCI transmission with a predetermined bit sequence.

In example 123, the apparatus of example 122, wherein the predetermined bit sequence is to specify a channel activation-and-deactivation Radio Network Temporary Identifier (RNTI).

In example 124, the apparatus of any of examples 119 through 123, wherein the one or more processors are further to: trigger a physical layer activation-and-deactivation circuitry to initiate an activation sequence when the corresponding channel status activation indicator has one of values of '1' and '0'.

In example 125, the apparatus of any of examples 119 through 123, wherein the one or more processors are to: trigger the physical layer activation-and-deactivation circuitry to initiate a deactivation sequence when the corresponding channel status activation indicator has one of values of '1' and '0'.

In example 126. A UE device comprising an application processor, a memory, one or more antennas, a wireless interface for allowing the application processor to communicate with another device, and a touch-screen display, the UE device including the apparatus of any of examples 119 through 125.

Example 127 provides machine readable storage media having machine executable instructions that, when executed, cause one or more processors to perform an operation comprising: process, for a User Equipment, a Downlink Control Information (DCI) transmission from a base station, the DCI transmission including a DCI codeword; decode a plurality of channel status activation indicators from the DCI codeword; and establish a plurality of physical layer activation indicators based on the plurality of channel status activation indicators.

In example 128, the machine readable storage media of example 127, wherein the DCI transmission is a Physical Downlink Control Channel (PDCCH) transmission, and wherein the format of the DCI transmission is Format 1C.

In example 129, the machine readable storage media of either of examples 127 or 128, the operation comprising: descramble a plurality of Cyclic Redundancy Check (CRC) bits of the DCI transmission with a predetermined bit sequence.

In example 130, the machine readable storage media of any of examples 127 through 129, wherein the predetermined bit sequence is to specify a channel activation-and-deactivation Radio Network Temporary Identifier (RNTI).

In example 131, the machine readable storage media of any of examples 127 through 130, wherein the third circuitry is operable to establish a physical layer activation indicator based upon one of the channel status activation indicators, the physical layer activation indicator being asserted when the channel status activation indicator has one of values of '1' and '0', and the physical layer activation indicator being deasserted when the channel status activation indicator has one of values of '1' and '0'.

Example 132 provides a method comprising: processing, for a User Equipment, a Downlink Control Information (DCI) transmission from a base station, the DCI transmission including a DCI codeword; decoding a plurality of channel status activation indicators from the DCI codeword; and establishing a plurality of physical layer activation indicators based on the plurality of channel status activation indicators.

In example 133, the method of example 132, wherein the DCI transmission is a Physical Downlink Control Channel (PDCCH) transmission, and wherein the format of the DCI transmission is Format 1C.

In example 134, the method of either of examples 132 or 133, comprising: descrambling a plurality of Cyclic Redundancy Check (CRC) bits of the DCI transmission with a predetermined bit sequence.

In example 135, the method of any of examples 132 through 134, wherein the predetermined bit sequence is to specify a channel activation-and-deactivation Radio Network Temporary Identifier (RNTI).

In example 136, the method of any of examples 132 through 135, wherein the third circuitry is operable to establish a physical layer activation indicator based upon one of the channel status activation indicators, the physical layer activation indicator being asserted when the channel status activation indicator has one of values of '1' and '0', and the physical layer activation indicator being deasserted when the channel status activation indicator has one of values of '1' and '0'.

Example 137 provides machine readable storage media having machine executable instructions stored thereon that, when executed, cause one or more processors to perform a method according to any one of examples 132 through 136.

Example 138 provides an apparatus of a User Equipment (UE), the UE being operable to communicate with a base station on a wireless network, comprising: means for processing a Downlink Control Information (DCI) transmission from a base station, the DCI transmission including a DCI codeword; means for decoding a plurality of channel status activation indicators from the DCI codeword; and means for establishing a plurality of physical layer activation indicators based on the plurality of channel status activation indicators.

In example 139, the apparatus of example 138, wherein the DCI transmission is a Physical Downlink Control Channel (PDCCH) transmission, and wherein the format of the DCI transmission is Format 1C.

In example 140, the apparatus of either of examples 138 or 139, comprising: means for descrambling a plurality of Cyclic Redundancy Check (CRC) bits of the DCI transmission with a predetermined bit sequence.

In example 141, the apparatus of any of examples 138 through 140, wherein the predetermined bit sequence is to specify a channel activation-and-deactivation Radio Network Temporary Identifier (RNTI).

In example 142, the apparatus of any of examples 138 through 141, wherein the third circuitry is operable to establish a physical layer activation indicator based upon one of the channel status activation indicators, the physical layer activation indicator being asserted when the channel status activation indicator has one of values of '1' and '0', and the physical layer activation indicator being deasserted when the channel status activation indicator has one of values of '1' and '0'.

Example 143 provides machine readable storage media having machine executable instructions stored thereon that, when executed, cause one or more processors to perform a method according to any one of examples 42 through 61, 73 through 77, 91 through 96, 97 through 102, 114 through 118, 119 through 126, and 138 through 142.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An apparatus of a base station, the base station configured to communicate with a User Equipment (UE) on a wireless network, the base station apparatus comprising:
   one or more processors configured to:
      generate a plurality of channel status activation indicators;
      encode the plurality of channel status activation indicators into a Downlink Control Information (DCI) codeword; and
      generate, for the UE, a DCI transmission carrying the DCI codeword,
      wherein the plurality of channel status activation indicators respectively correspond to a plurality of Standard Trading Units (STUs) served by the base station, and wherein the plurality of channel status activation indicators indicate one or more of the plurality of STUs to be deactivated or one or more of the plurality of STUs to be activated.

2. The base station apparatus of claim 1, wherein a format of the DCI transmission is Format 1C.

3. The base station apparatus of claim 1, wherein the one or more processors are further configured to:
   scramble a plurality of Cyclic Redundancy Check (CRC) bits of the DCI transmission with a predetermined bit sequence.

4. The base station apparatus of claim 3, wherein the predetermined bit sequence is to specify a channel activation-and-deactivation Radio Network Temporary Identifier (RNTI).

5. The base station apparatus of claim 1, wherein each of the plurality of STUs comprises a frequency band or channel, a geographical region, and a time period.

6. Machine readable non-transitory storage media having machine executable instructions that, when executed, cause one or more processors to perform operations comprising:
   generating, by a base station, a plurality of channel status activation indicators;
   encoding the plurality of channel status activation indicators into a Downlink Control Information (DCI) codeword; and
   generating, for a User Equipment (UE), a DCI transmission carrying the DCI codeword,
   wherein the plurality of channel status activation indicators respectively correspond with a plurality of Standard Trading Units (STUs) served by the base station, and wherein the plurality of channel status activation indicators indicate one or more of the plurality of STUs to be deactivated or one or more of the plurality of STUs to be activated.

7. The machine readable storage media of claim 6, wherein the operations further comprising:
   scrambling a plurality of Cyclic Redundancy Check (CRC) bits of the DCI transmission with a predetermined bit sequence.

8. The machine readable storage media of claim 7, wherein the predetermined bit sequence is to specify a channel activation-and-deactivation Radio Network Temporary Identifier (RNTI).

9. The machine readable storage media of claim 6, wherein each of the plurality of STUs comprises a frequency band or channel, a geographical region, and a time period.

10. A User Equipment (UE) configured to communicate with a base station on a wireless network, the UE comprising:
    one or more processors configured to:
       process a Downlink Control Information (DCI) transmission from the base station, the DCI transmission including a DCI codeword;
       decode a plurality of channel status activation indicators from the DCI codeword; and
       trigger a plurality of physical layer activation-and-deactivation circuitries based on the plurality of channel status activation indicators, wherein the plurality of channel status activation indicators respectively correspond with a plurality of Standard Trading Units (STUs) served by the base station.

11. The UE of claim 10, wherein a format of the DCI transmission is Format 1C.

12. The UE of claim 10, wherein the one or more processors are further configured to:
descramble a plurality of Cyclic Redundancy Check (CRC) bits of the DCI transmission with a predetermined bit sequence.

13. The UE of claim 12, wherein the predetermined bit sequence is to specify a channel activation-and-deactivation Radio Network Temporary Identifier (RNTI).

14. The UE of claim 10, wherein the one or more processors are further configured to:
trigger a physical layer activation-and-deactivation circuitry to initiate an activation sequence in response to the corresponding channel status activation indicator having a value of '1'.

15. The UE of claim 10, wherein the one or more processors are further configured to:
trigger a physical layer activation-and-deactivation circuitry to initiate a deactivation sequence in response to the corresponding channel status activation indicator having a value of '0'.

16. The UE of claim 10, wherein the plurality of channel status activation indicators indicate one or more of the plurality of STUs to be deactivated or one or more of the plurality of STUs to be activated.

17. The UE of claim 10, wherein each of the plurality of STUs comprises a frequency band or channel, a geographical region, and a time period.

18. Machine readable non-transitory storage media having machine executable instructions that, when executed, cause one or more processors to perform operations comprising:
processing, by a User Equipment, a Downlink Control Information (DCI) transmission from a base station, the DCI transmission including a DCI codeword;
decoding a plurality of channel status activation indicators from the DCI codeword; and
establishing a plurality of physical layer activation indicators based on the plurality of channel status activation indicators,
wherein the plurality of channel status activation indicators respectively correspond with a plurality of Standard Trading Units (STUs) served by the base station.

19. The machine readable storage media of claim 18, wherein the operations further comprising:
descrambling a plurality of Cyclic Redundancy Check (CRC) bits of the DCI transmission with a predetermined bit sequence.

20. The machine readable storage media of claim 18, wherein the operations further comprising:
establishing a physical layer activation indicator based on one of the plurality of channel status activation indicators, the physical layer activation indicator being asserted in response to the one of the plurality of channel status activation indicators having a value of '1', and the physical layer activation indicator being deasserted in response to the one of the plurality of channel status activation indicators having a value of '0'.

21. The machine readable storage media of claim 18, wherein the predetermined bit sequence is to specify a channel activation-and-deactivation Radio Network Temporary Identifier (RNTI).

22. The machine readable storage media of claim 18, wherein the plurality of channel status activation indicators indicate one or more of the plurality of STUs to be deactivated or one or more of the plurality of STUs to be activated.

* * * * *